United States Patent
Nakano et al.

(10) Patent No.: US 9,598,773 B2
(45) Date of Patent: *Mar. 21, 2017

(54) METHOD FOR PRODUCING BLACK-PLATED STEEL SHEET, AND METHOD FOR PRODUCING MOLDED ARTICLE OF BLACK-PLATED STEEL SHEET

(71) Applicant: NISSHIN STEEL CO., LTD., Tokyo (JP)

(72) Inventors: Tadashi Nakano, Tokyo (JP); Masaya Yamamoto, Tokyo (JP); Hirofumi Taketsu, Tokyo (JP)

(73) Assignee: NISSHIN STEEL CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/396,210

(22) PCT Filed: Apr. 23, 2013

(86) PCT No.: PCT/JP2013/002717
§ 371 (c)(1),
(2) Date: Oct. 22, 2014

(87) PCT Pub. No.: WO2013/161268
PCT Pub. Date: Oct. 31, 2013

(65) Prior Publication Data
US 2015/0083276 A1 Mar. 26, 2015

(30) Foreign Application Priority Data

Apr. 25, 2012 (JP) .................................. 2012-100449
Mar. 25, 2013 (JP) .................................. 2013-062233

(51) Int. Cl.
*C23C 8/10* (2006.01)
*C23C 22/53* (2006.01)
(Continued)

(52) U.S. Cl.
CPC ............ *C23C 22/05* (2013.01); *B32B 15/013* (2013.01); *C22C 1/02* (2013.01); *C22C 18/00* (2013.01);
(Continued)

(58) Field of Classification Search
CPC .... C23C 8/02; C23C 8/16; C23C 8/80; C23C 2/12; C23C 2/26; C23C 22/53
See application file for complete search history.

(56) References Cited

U.S. PATENT DOCUMENTS 5,429,880 A * 7/1995 Kubota et al. ................ 428/623
6,465,114 B1 10/2002 Honda et al.
(Continued)

FOREIGN PATENT DOCUMENTS

EP 2204464 A1 7/2010
GB 889790 A 2/1962
(Continued)

OTHER PUBLICATIONS

International Search Report from International Application No. PCT/JP13/002717 mailed on Jun. 18, 2013.
(Continued)

*Primary Examiner* — Lois Zheng
(74) *Attorney, Agent, or Firm* — Brundidge & Stanger, P.C.

(57) ABSTRACT

The present invention pertains to a method for producing a black-plated steel sheet capable of being blackened in a short amount of time, and exhibiting an excellent ability to maintain a black appearance after processing. As an original sheet, the sheet used is a Zn-plating steel sheet which
(Continued)

contains molten Al and Mg and has a Zn-plating layer containing molten Al and Mg, containing Al in the amount of 1.0-22.0 mass %, inclusive, and containing Mg in the amount of 1.5-10.0 mass %, inclusive. The plating layer is blackened by causing the molten-plating steel sheet to contact water vapor inside a tightly sealed container. When doing so, the concentration of oxygen inside the tightly sealed container is 13% or less.

11 Claims, 4 Drawing Sheets

(51) Int. Cl.
| | |
|---|---|
| *C23C 8/02* | (2006.01) |
| *C23C 22/05* | (2006.01) |
| *C23C 2/06* | (2006.01) |
| *C22C 18/00* | (2006.01) |
| *C22C 18/04* | (2006.01) |
| *C23C 28/00* | (2006.01) |
| *C23C 2/26* | (2006.01) |
| *C23C 8/18* | (2006.01) |
| *B32B 15/01* | (2006.01) |
| *C22C 38/00* | (2006.01) |
| *C23C 22/73* | (2006.01) |
| *C23C 22/82* | (2006.01) |
| *C22C 1/02* | (2006.01) |
| *C23C 2/12* | (2006.01) |

(52) U.S. Cl.
CPC .............. *C22C 18/04* (2013.01); *C22C 38/00* (2013.01); *C23C 2/06* (2013.01); *C23C 2/26* (2013.01); *C23C 8/02* (2013.01); *C23C 8/18* (2013.01); *C23C 22/73* (2013.01); *C23C 22/82* (2013.01); *C23C 28/00* (2013.01); *C23C 28/321* (2013.01); *C23C 28/3225* (2013.01); *C23C 28/34* (2013.01); *C23C 28/345* (2013.01); *C23C 2/12* (2013.01); *C23C 2222/00* (2013.01)

(56) References Cited

U.S. PATENT DOCUMENTS

| | | |
|---|---|---|
| 2010/0212590 A1 | 8/2010 | Sato et al. |
| 2013/0171468 A1 | 7/2013 | Imokawa et al. |

FOREIGN PATENT DOCUMENTS

| | | | | |
|---|---|---|---|---|
| JP | 64-056881 A | | 3/1989 | |
| JP | 10-306357 | * | 11/1998 | ............... C23C 2/06 |
| JP | 2000-104154 A | | 4/2000 | |
| JP | 2005-008953 | * | 1/2005 | ............... B05D 5/08 |
| JP | 2005-008953 A | | 1/2005 | |
| JP | 2012-067369 A | | 4/2012 | |

OTHER PUBLICATIONS

Extended European Search Report issued in EP 13782638.4, dated Nov. 9, 2015.

* cited by examiner

1

METHOD FOR PRODUCING BLACK-PLATED STEEL SHEET, AND METHOD FOR PRODUCING MOLDED ARTICLE OF BLACK-PLATED STEEL SHEET

TECHNICAL FIELD

The present invention relates to a method for producing a black-plated steel sheet and a method for producing a formed article of the black-plated steel sheet.

BACKGROUND ART

In the field such as roofing materials and exterior materials of a building, home appliances and automobiles, the needs for steel sheets having a black appearance is increasing from the viewpoints of design and so on. The surface of a steel sheet may be blackened by applying a black coating material to the surface of a steel sheet so as to form a black coating film. In the field described above, however, steel sheets with plating such as hot-dip Zn-plating, hot-dip Al-containing Zn-plating, and hot-dip Al and Mg-containing Zn-plating are used in many cases from the viewpoint of corrosion resistance. The plated steel sheet has a metallic gloss surface with silver gray color. Accordingly, in order to obtain a black appearance of quality design by application of a black coating material, a thick coating film is required to conceal the color of the plated steel sheet, resulting in high coating costs. Furthermore, the thick coating film precludes resistance welding such as spot welding, which is another disadvantage.

As a method for concealing the metallic gloss with silver gray color of a plated steel sheet without formation of a black coating film, a method for blackening a plating layer itself has been proposed (e.g. refer to PTL 1). PTL 1 discloses a method for forming a thin black layer at the plating layer surface by blowing high-temperature water vapor onto a hot-dip Al-containing Zn-plated steel sheet for 24 hours or more. In the method for producing a black-plated steel sheet described in PTL 1, blackening accelerating element such as Mg, Cu and Bi are contained in a plating layer. It is, however, described that a content of the blackening accelerating elements more than 1% inhibits oxidation of Zn, rather resulting in reduction in the accelerating effects for blackening.

CITATION LIST

Patent Literature

PTL 1
Japanese Patent Application Laid-Open No. SHO 64-56881

SUMMARY OF INVENTION

Technical Problem

A problem in the method for producing a black-plated steel sheet described in PTL 1 is that when the plating layer is blackened over the whole thickness, the plating layer is embrittled to lower the adhesion and therefore a thick black layer cannot be formed. Therefore, in the black-plated steel sheet produced by the production method described in PTL 1, when the surface of the plating layer is scratched by processing or the like, silvery-white color being the color of the plating layer itself is exposed, which deteriorates the surface appearance, and therefore the black-plated steel sheet cannot stand intense processing. Furthermore, another problem in the method for producing a black-plated steel sheet described in PTL 1 is that the blackening treatment requires a long time.

An object of the present invention is to provide a method for producing a black-plated steel sheet capable of being blackened in a short time and exhibiting an excellent ability to maintain a black appearance after processing. Moreover, another object of the present invention is to provide a method for producing a formed article of the black-plated steel sheet.

Solution to Problem

The present inventors have found that the problems can be solved by using, as an original plate, a hot-dip Al and Mg-containing Zn-plated steel sheet including a hot-dip Al and Mg-containing Zn-plated layer which includes 1.0 mass % or more and 22.0 mass % or less of Al and 1.5 mass % or more and 10.0 mass % or less of Mg and contacting the plated steel sheet with water vapor in a closed vessel, and have made further studies to complete the present invention.

Namely, the first of the present invention relates to the following method for producing a black-plated steel sheet.

[1] A method for producing a black-plated steel sheet including: providing a hot-dip Al and Mg-containing Zn-plated steel sheet including a hot-dip Al and Mg-containing Zn-plated layer which includes 1.0 mass % or more and 22.0 mass % or less of Al and 1.5 mass % or more and 10.0 mass % or less of Mg; and contacting the hot-dip Al and Mg-containing Zn-plated steel sheet with water vapor in a closed vessel, in which an oxygen concentration in the closed vessel is 13% or less.

[2] The method for producing a black-plated steel sheet according to [1], further including forming an inorganic coating film on a surface of the hot-dip Al and Mg-containing Zn-plated steel sheet.

[3] The method for producing a black-plated steel sheet according to [2], in which the inorganic coating film includes one or more compounds selected from the group consisting of an oxide of valve metal, an oxoate of valve metal, a hydroxide of valve metal, a phosphate of valve metal, and a fluoride of valve metal.

[4] The method for producing a black-plated steel sheet according to [3], in which the valve metal is one or more metals selected from the group consisting of Ti, Zr, Hf, V, Nb, Ta, W, Si, and Al.

[5] The method for producing a black-plated steel sheet according to [1], further including forming an organic resin coating film on a surface of the hot-dip Al and Mg-containing Zn-plated steel sheet.

[6] The method for producing a black-plated steel sheet according to [5], in which an organic resin comprised in the organic resin coating film is urethane-based resin obtained by the reaction of polyols consisting of an ether-based polyol and an ester-based polyol with polyisocyanate, a proportion of the ether-based polyol in the polyols being 5 to 30 mass %.

[7] The method for producing a black-plated steel sheet according to [6], in which the organic resin coating film further includes a polyvalent phenol.

[8] The method for producing a black-plated steel sheet according to any one of [5] to [7], in which the organic resin coating film includes a lubricant.

[9] The method for producing a black-plated steel sheet according to any one of [5] to [8], in which the organic resin coating film includes one or more compounds selected from the group consisting of an oxide of valve metal, an oxoate of valve metal, a hydroxide of valve metal, a phosphate of valve metal, and a fluoride of valve metal.

[10] The method for producing a black-plated steel sheet according to [9], in which the valve metal is one or more metals selected from the group consisting of Ti, Zr, Hf, V, Nb, Ta, W, Si, and Al.

[11] The method for producing a black-plated steel sheet according to any one of [5] to [10], in which the organic resin coating film is a laminate layer or a coating layer.

[12] The method for producing a black-plated steel sheet according to any one of [5] to [11], in which the organic resin coating film is a clear coating film.

Moreover, the second of the present invention relates to the following method for producing a formed article of a black-plated steel sheet.

[13] A method for producing a formed article of a black-plated steel sheet, including: providing a hot-dip Al and Mg-containing Zn-plated steel sheet including a hot-dip Al and Mg-containing Zn-plated layer which includes 1.0 mass % or more and 22.0 mass % or less of Al and 1.5 mass % or more and 10.0 mass % or less of Mg; contacting the hot-dip Al and Mg-containing Zn-plated steel sheet with water vapor in a closed vessel; and forming the hot-dip Al and Mg-containing Zn-plated steel sheet before or after contacting the hot-dip Al and Mg-containing Zn-plated steel sheet with the water vapor, in which an oxygen concentration in the closed vessel is 13% or less.

Advantageous Effects of Invention

According to the present invention, a black-plated steel sheet having a black appearance excellent in design property, the black-plated steel sheet exhibiting an excellent ability to maintain a black appearance after processing and a formed article thereof can be produced in a short time. The produced black-plated steel sheet of the present invention is excellent in design, retention of the black appearance, press formability and corrosion resistance, being applicable as a plated steel sheet for, for example, roofing materials and exterior materials of a building, home appliances, and automobiles.

DESCRIPTION OF EMBODIMENTS

Figure 1A:
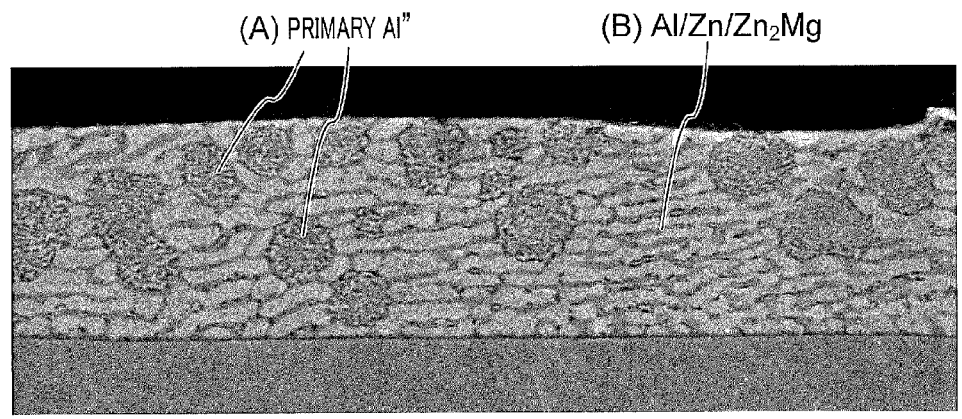
FIG. 1A is a scanning electron microscopic image illustrating a cross section of a plating layer of a hot-dip Al and Mg-containing Zn-plated steel sheet before water vapor treatment.

1. Method for Producing Black-Plated Steel Sheet

The production method of a black-plated steel sheet of the present invention includes: 1) a first step of providing a hot-dip Al and Mg-containing Zn-plated steel sheet; and 2) a second step of contacting the Al and Mg-containing Zn-plated steel sheet with water vapor in a closed vessel. The method may further include: 3) a third step of forming an inorganic coating film or organic resin coating film on the surface of the hot-dip Al and Mg-containing Zn-plated steel sheet, before or after the second step as an optional step.

[First Step]

A hot-dip Al and Mg-containing Zn-plated steel sheet in which a hot-dip Al and Mg-containing Zn-plated layer (hereinafter also referred to as "plating layer") is formed on a surface of a base material steel sheet is prepared in the first step.

(Base Material Steel Sheet)

The kind of the base material steel sheet is not particularly limited. As a base material steel sheet, for example, a steel sheet including low carbon steel, medium carbon steel, high carbon steel, alloy steel, or the like can be used. In the case where a favorable press formability is required, a steel sheet for deep drawing including low carbon Ti-added steel, low carbon Nb-added steel, or the like is preferable as a base material steel sheet. Moreover, a high strength steel sheet in which P, Si, Mn, or the like is added may be used.

(Hot-Dip al and Mg-Containing Zn-Plated Layer)

As an original plate to be used in the production method of the present invention, a hot-dip Al and Mg-containing Zn-plated steel sheet including a hot-dip Al and Mg-containing Zn-plated layer which includes 1.0 mass % or more and 22.0 mass % or less of Al and 1.5 mass % or more and 10.0 mass % or less of Mg is used. More preferably, a hot-dip Al and Mg-containing Zn-plated steel sheet is used, including a hot-dip Al and Mg-containing Zn-plated layer which further contains a single phase of Al as the metal texture of the plating layer. The term "single phase of Al" means an Al phase having no eutectic structure, such as an Al" phase with Zn in solid solution state. The single phase of Al is, for example, a primary Al". Al and Mg are elements that improve corrosion resistance of a Zn based-plated steel sheet, and are essential elements for conducting blackening in the present invention as will be described later. In the case where the Al content or the Mg content is smaller than the lower limit value in the range, sufficient corrosion resistance is not obtained. On the other hand, in the case where the Al content or the Mg content is larger than the upper limit value, a beautiful plated steel sheet cannot be obtained due to excessive generation of oxides (dross) at a plating bath surface during production of the plated steel sheet.

The hot-dip Al and Mg-containing Zn-plated layer having the composition described above includes a ternary eutectic structure of Al/Zn/$Zn_2Mg$. When the cross section of a plating layer is observed, for example, as in FIGS. 1A and 1B, the proportion of the ternary eutectic structure of Al/Zn/$Zn_2Mg$ in the entire cross section is different depending on a plating composition. In the ternary system of Zn—Al—Mg, the eutectic composition includes about 4 mass % of Al and about 3 mass % of Mg. In the case of a plating composition close to the eutectic composition, the ternary eutectic structure of Al/Zn/$Zn_2Mg$, accordingly, is a phase having the largest area in the plating cross section, having an area ratio of about 80%. The area ratio, however, decreases as the composition deviates from the eutectic composition, so that a phase other than the ternary eutectic structure of Al/Zn/Zn$_2$Mg may have the largest area ratio in some cases. Depending on a plating composition, the hot-dip Al and Mg-containing Zn plated layer further includes a primary Al". The cross sectional schematic view of a plating layer having a plating composition with an Al concentration of 6.0 mass %, an Mg concentration of 3.0 mass %, and a balance of Zn is illustrated, for example, in FIG. 1A. In the plating layer, the ternary eutectic structure of Al/Zn/Zn$_2$Mg (denoted as "Al/Zn/Zn$_2$Mg" in the drawing) and the primary crystal structure of Al (denoted as "primary Al"" in the drawing) are mixed. The primary Al" can be clearly discriminated from the Al phase of the ternary eutectic in microscopic observation. Depending on a plating composition, the primary crystal of a plating layer may be formed of a Zn phase, a Zn$_2$Mg phase, or an Mg$_2$Si phase, instead of the Al phase.

As illustrated in FIG. 1A, respective phases (Al phase, Zn phase, and Zn$_2$Mg phase) that form the Al/Zn/Zn$_2$Mg ternary eutectic structure each have an irregular size and shape, and are complicated with one another. The Zn phase (the region showing a light gray color in the ternary eutectic structure in FIG. 1A) in the Al/Zn/Zn$_2$Mg ternary eutectic structure is a Zn solid solution that makes a solid solution with a small amount of Al and further makes a solid solution with Mg depending on the circumstance. The Zn$_2$Mg phase in the ternary eutectic structure (the region showing dark gray color in the ternary eutectic structure in FIG. 1A and the region distributed in a lamellar form between the Zn phases) is an intermetallic compound phase that is present near the point where Zn accounts for about 84 mass % in a Zn—Mg binary equilibrium diagram.

Moreover, the Al phase and the Al phase of the primary crystal in the ternary eutectic structure are derived from an Al" phase (Al solid solution that makes a solid solution with Zn and includes a small amount of Mg) at a high temperature in an Al—Zn—Mg ternary equilibrium diagram. The Al" phase at a high temperature usually appears as a fine Al phase and a fine Zn phase separately at normal temperature. The fine Al phase and the fine Zn phase in the ternary eutectic structure are dispersed in the Zn$_2$Mg phase.

(Production of Hot-Dip Al and Mg-Containing Zn-Plated Steel Sheet)

The hot-dip Al and Mg-containing Zn-plated steel sheet can be produced by, for example, preparing a hot-dip plating bath including 1.0 mass % or more and 22.0 mass % or less of Al, 1.5 mass % or more and 10.0 mass % or less of Mg, and the balance of Zn, dipping a base material steel sheet in the hot-dip plating bath, and then pulling up the base material steel sheet to apply hot-dip plating on the surface of the base material steel sheet.

Moreover, Si that can suppress the growth of an Al—Fe alloy layer at an interface of the base material steel sheet and the plating layer may be added to the plating bath in a range of 0.005 mass % to 2.0 mass % in order to improve the adhesion of the base material steel sheet with the plating layer. In the case, it sometimes occurs that an Mg$_2$Si phase is observed as a metal structure in the plating layer. When the concentration of Si exceeds 2.0 mass %, there is a risk that a Si-based oxide that inhibits blackening is generated at the surface of the plating layer.

Moreover, Ti, B, Ti—B alloy, a Ti-containing compound, or a B-containing compound may be added to the plating bath in order to suppress the generation and growth of a Zn$_{11}$Mg$_2$ phase that gives an adverse influence on the appearance and the corrosion resistance. It is preferable to set the amount of these compounds added so as to be within a range of 0.001 mass % to 0.1 mass % for Ti, and within a range of 0.0005 mass % to 0.045 mass % for B. When Ti or B is added in an excessive amount, there is a risk that a precipitate is grown in the plating layer. In addition, the addition of Ti, B, Ti—B alloy, the Ti-containing compound, or the B-containing compound gives little influence on blackening by water vapor treatment.

In addition, in the present specification, the content value of each component in the plating layer is a value obtained by dividing the mass of each metal component contained in the plating layer by the mass of the whole metals contained in the plating layer and expressed by percentage. Namely, the mass of oxygen and the mass of water contained in the oxides or hydrated oxides are not included as a component in the plating layer. Thus, in the case where the elution of a metal component during the water vapor treatment does not occur, the content value of each component in the plating layer before and after the water vapor treatment does not change.

The thickness of the plating layer is not particularly limited, however, it is preferable that the thickness of the plating layer is within a range of 3 to 100 μm. In the case where the thickness of the plating layer is less than 3 μm, a scratch that reaches the base material steel sheet during handling is liable to occur, and therefore there is a risk that the corrosion resistance and the ability to maintain a black appearance are lowered. On the other hand, when the thickness of the plating layer exceeds 100 μm, there is a risk that the plating layer and the base material steel sheet are separated in a processed part because the ductility of the plating layer is different from the ductility of the base material steel sheet when the plating layer and the base material steel sheet are subjected to compression.

[Second Step]

The plated steel sheet prepared in the first step is contacted with water vapor in a closed vessel to blacken the plating layer in the second step. By contacting Hot-dip Al and Mg-Containing Zn-Plated Steel Sheet with Water Vapor in Closed Vessel, it is possible to lower the surface lightness (L* value) of the plating layer to 60 or less (preferably 40 or less, further preferably 35 or less). The surface lightness (L* value) of the plating layer is measured by a spectral reflection measuring method in accordance with JIS K 5600 using a spectroscopic color-difference meter.

Figure 2A:
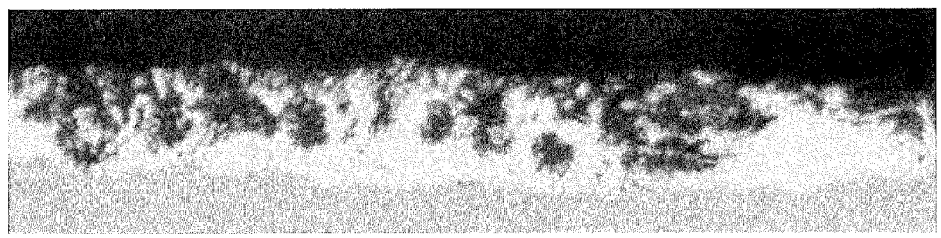
FIG. 2A is an optical microscopic image of the cross section of plating layer of a hot-dip Al and Mg-containing Zn-plated steel sheet after water vapor treatment.

When the plated steel sheet is contacted with water vapor in the second step, a black oxide is generated in the plating layer (refer to FIG. 2A). Here, "in the plating layer" includes both of the surface of the plating layer and the inside of the plating layer. The mechanism by which the black oxide is generated is not particularly limited, however it is inferred as follows.

Oxide of Al and Mg being easily oxidizable elements are present at the surface of the plating layer. When the water vapor treatment is started, an oxidation layer at the surface reacts with H$_2$O to be changed to a hydrated oxide in the first place, and H$_2$O having passed through the oxide layer reacts with a metal in the plating layer. On this occasion, Zn contained in the Zn$_2$Mg phase to constitute the ternary eutectic structure is preferentially oxidized. The oxidation of Zn contained in the Zn$_2$Mg phase progresses in a depth direction of the plating layer as time passes. Under water vapor atmosphere with a low oxygen potential, Mg in the vicinity of oxides of Zn, having high reactivity with oxygen, robs oxides of Zn of oxygen so as to form oxides of Mg. Therefore, it is considered that the Zn oxide is changed to an oxygen deficient-type oxide (for example, ZnO$_{1-x}$) with nonstoichiometric composition. When the oxygen deficient-type oxide is generated as described here, light is trapped in the defect level, and therefore the oxide shows a black appearance. The method for producing the black plated steel sheet of the present invention, therefore, allows for acceleration of blackening as the Mg content in a plating layer increases, which is different from the black-plated steel sheet of PTL 1. On the other hand, the oxidation reaction of Zn contained in a Zn phase proceeds slowly, so that the most part of Zn remains as metal. As a result, the plating layer of a black-plated steel sheet obtained by the present invention includes a metal texture of black oxides of Zn derived from $Zn_2Mg$ phases distributed in a lamellar form. Depending on a plating composition and cooling conditions of the plating layer, $Zn_{11}Mg_2$ phases may also exist in the plating layer in some cases. In this case, Zn contained in the $Zn_{11}Mg_2$ phase is also oxidized, and Mg existing in the circumference is robbed of oxygen, so as to form oxygen-deficient oxides of Zn having a black color.

Figure 1B:
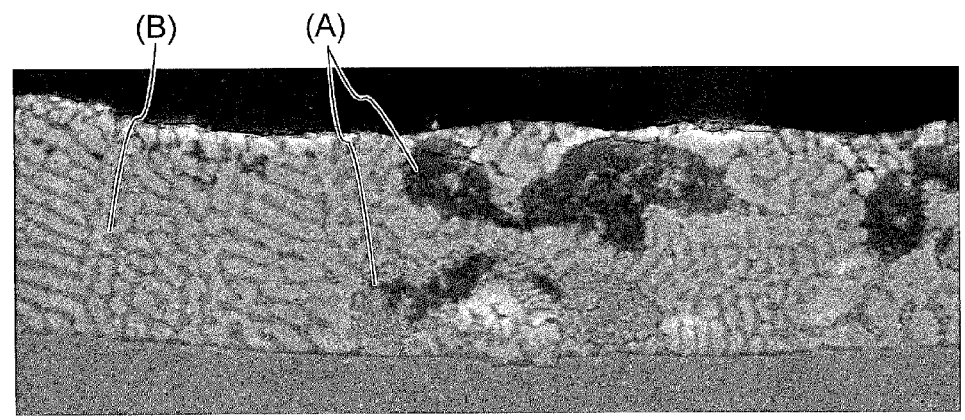
FIG. 1B is a scanning electron microscopic image illustrating a cross section of a plating layer of a hot-dip Al and Mg-containing Zn-plated steel sheet after water vapor treatment.

In the case of a plating layer having an Al single phase, the black oxides of Zn develop in the interior of the plating layer in a shorter time. Al has higher reactivity with $H_2O$ compared with Zn and Mg. As a result, metal Al coming into contact with water vapor at high temperature rapidly forms into oxides. After Al contained in the Al single phase is rapidly oxidized, oxidation of Zn contained in the $Zn_2Mg$ phase located thereunder proceeds in the depth direction of a plating layer. The Al single phase thus functions as a "passage" for accelerating the oxidation of Al in the interior of a plating layer. As a result, the presence of an Al single phase in a plating layer allows for formation of black oxides of Zn in the plating layer for a shorter time. With reference to FIG. 1B, it is shown that the depth where the black oxides of Zn exist is different between a region having the Al single phase (primary Al") and a region having no Al single phase.

In the production method of PTL 1, only the surface of the plating layer is blackened due to the generation of a needle crystal of $ZnO_{1-x}$. On the other hand, in the production method of the present invention, a layered black oxide layer is formed at the surface of the plating layer, and the particulate black oxide is dispersed inside the plating layer, taking the aforementioned reaction mechanism into consideration. Thus, in the black-plated steel sheet produced by the production method of the present invention, even when a scratch occurs in the plating layer by processing, the black appearance is maintained. It can be confirmed by observing the cross section of the plating layer by an optical microscope (refer to FIG. 2A) or by removing metals, Zn, Al, and Mg, in the plating layer by amalgamation using a saturated $HgCl_2$ solution to collect only the oxide that the oxide being present inside the plating layer shows black color. In addition, the black oxide dispersed in the plating layer may be blackened to the inside thereof or only at the surface thereof.

When oxygen is present in the atmosphere in conducting the water vapor treatment in the second step, blackening cannot sufficiently be conducted. It is inferred that this is because when the water vapor treatment is conducted in the atmosphere where a large amount of oxygen is contained, the formation of basic zinc aluminum carbonate showing gray color at the surface layer has priority over the formation of the oxygen deficient-type oxide showing black color. Thus, it is necessary to conduct the water vapor treatment reducing the oxygen concentration (oxygen partial pressure) in the atmosphere in the second step. Specifically, it is preferable that the oxygen concentration during the water vapor treatment is 13% or less. The method for reducing the oxygen concentration in the atmosphere is not particularly limited. For example, the water vapor concentration (relative humidity) may be raised, the air in the vessel may be replaced with an inert gas, or the air in the vessel may be removed by a vacuum pump or the like. In any of the cases, it is necessary that the water vapor treatment is conducted in a closed vessel.

Figure 3A:
FIG. 3A is a photograph illustrating the surface of a hot-dip Al and Mg-containing Zn-plated steel sheet after water vapor treatment in an open system.
Figure 3B:
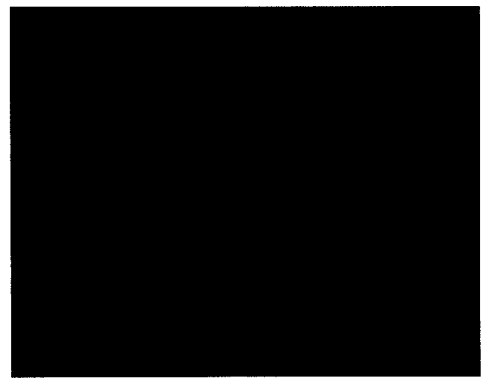
FIG. 3B is a photograph illustrating the surface of a hot-dip Al and Mg-containing Zn-plated steel sheet after water vapor treatment in a closed system.

In the method for producing a black-plated steel sheet described in PTL 1, high-temperature water vapor is sprayed to the surface of a plated steel sheet. It is accordingly believed that the water vapor treatment is performed in an open system in which the oxygen concentration cannot be adjusted. The plating layer cannot be, however, sufficiently blackened by the water vapor treatment of the hot-dip Al and Mg-containing Zn-plated steel sheet prepared in the first step in an open system in which the oxygen concentration cannot be adjusted. FIG. 3A and FIG. 3B are photographs illustrating the results of water vapor treatment of a hot-dip Al and Mg-containing Zn-plated steel sheet having a hot-dip Al and Mg-containing Zn-plated layer with an Al content of 6.0 mass % and an Mg content of 3.0 mass %. FIG. 3A is a photograph illustrating the hot-dip Al and Mg-containing Zn-plated steel sheet after spraying water vapor having a temperature of 98° C. for 60 hours in an open system with an oxygen concentration more than 13% (L* value: 62). FIG. 3B is a photograph illustrating the hot-dip Al and Mg-containing Zn-plated steel sheet after contacting with water vapor having a temperature of 140° C. for 4 hours in a closed system with an oxygen concentration of 13% or less (L* value: 32). The photographs indicate that the water vapor treatment is required to be performed in a closed system oxygen concentration of which can be adjusted for sufficient blackening of the hot-dip Al and Mg-containing Zn-plated layer including 1.0 mass % or more and 22.0 mass % or less of Al and 1.5 mass % or more and 10.0 mass % or less of Mg.

(Treatment Temperature)

It is preferable that the temperature for the water vapor treatment is within a range of 50° C. or more and 350° C. or less. When the temperature for the water vapor treatment is less than 50° C., the rate of blackening is slow and the productivity is lowered. Moreover, when water is heated to 100° C. or more in the closed vessel, the pressure in the vessel becomes 1 atmospheric pressure or higher and the oxygen concentration in the atmosphere can easily be reduced, and therefore it is more preferable that the temperature of the water vapor treatment is 100° C. or more. On the other hand, when the temperature for the water vapor treatment exceeds 350° C., the control of the blackening rate becomes difficult due to an extremely high blackening rate. Moreover, when the temperature for the water vapor treatment exceeds 350° C., not only a large-sized treatment apparatus is required, but also the total treatment time including time required for raising and reducing temperature becomes long, which is not practical. Thus, it is particularly preferable from the standpoints of removal of oxygen in the atmosphere and control of the rate of blackening that the temperature for the water vapor treatment is within a range of 100° C. or more and 200° C. or less.

In the case where the temperature for the water vapor treatment is desired to be reduced to less than 100° C., an inert gas may be put into the vessel in order to suppress the mixing of oxygen by setting the pressure in the vessel to atmospheric pressure or higher. The kind of the inert gas is not particularly limited as long as the inert gas has no relation to the blackening reaction. Examples of the inert gas include Ar, $N_2$, He, Ne, Kr, and Xe. Among these inert gases, Ar, $N_2$, and He that are available at low cost are preferable. Moreover, the water vapor treatment may be conducted after removing the air in the vessel by a vacuum pump or the like.

(Relative Humidity)

It is preferable that the relative humidity of water vapor during the water vapor treatment is within a range of 30% or more and 100% or less, more preferably within a range of 30% or more and less than 100%. In the case where the relative humidity of water vapor is less than 30%, the rate of blackening is slow and the productivity is lowered. Moreover, in the case where the relative humidity of water vapor is 100%, there is a risk that poor appearance is liable to occur due to adherence of dew condensation water to the surface of the plated steel sheet.

The treatment time for the water vapor treatment can appropriately be set depending on the conditions of the water vapor treatment (temperature, relative humidity, pressure, and so on), the amount of Al and Mg in the plating layer, required lightness, and so on.

(Preheating)

Moreover, when the plated steel sheet is heated before conducting the water vapor treatment to form $Zn_{11}Mg_2$ from $Zn_2Mg$ in the plating layer, it is possible to shorten the time for the water vapor treatment for obtaining black appearance of the plating layer. It is preferable that the heating temperature of the plated steel sheet at this time is within a range of 150 to 350° C. In the case where the heating temperature is less than 150° C., the treatment time until $Zn_{11}Mg_2$ is formed from $Zn_2Mg$ by preheating becomes long, and therefore the merit of shortening the time for the water vapor treatment is not obtained. On the other hand, in the case where the heating temperature exceeds 350° C., it is possible to change $Zn_2Mg$ to $Zn_{11}Mg_2$ in a short time, however when the reaction further proceeds, there is a risk that the change in state of the plating layer progresses and the plating layer in which respective phases are separated and which is inferior in corrosion resistance is made, and therefore the control of preheating is difficult. The treating time of preheating may appropriately be set depending on the treatment temperature, the amount of Al and Mg in the plating layer, and so on. Usually, heating at 250° C. for about 2 hours may be enough.

The water vapor treatment may be conducted to any of a plated steel sheet wound in the shape of a coil, a planar plated steel sheet before forming, and a plated steel sheet after conducting forming, welding, or the like.

[Optional Step]

An inorganic coating film or an organic resin coating film is formed on the surface of the hot-dip Al and Mg-containing Zn-plated steel sheet in an optional step which is conducted before or after the second step. The inorganic coating film and the organic resin coating film improve the corrosion resistance and the galling resistance (retention of black appearance) of a black-plated steel sheet.

(Inorganic Coating Film)

The inorganic coating film preferably includes one or more compounds (hereinafter referred to as "valve metal compound") selected from the group consisting of an oxide of valve metal, an oxoate of valve metal, a hydroxide of valve metal, a phosphate of valve metal, and a fluoride of valve metal. Inclusion of a valve metal compound reduces an environmental load and imparts an excellent barrier function. The valve metal means a metal the oxide of which exhibits high insulation resistance. Examples of the valve metal include one or more metals selected from the group consisting of Ti, Zr, Hf, V, Nb, Ta, W, Si, and Al. A known compound may be used as the valve metal compound.

Inclusion of a soluble fluoride of valve metal in an inorganic coating film can impart a self-repairing function. The fluoride of valve metal dissolved in moisture in atmosphere forms oxides or hydroxides having poor solubility, reprecipitating on the steel sheet exposed from defect regions in a coating film so as to bury the defect regions. For inclusion of the soluble fluoride of valve metal in an inorganic coating film, a soluble fluoride of valve metal may be added to the inorganic coating material, or a soluble fluoride such as $(NH_4)F$ may be added in addition to a valve metal compound.

The inorganic coating film may further include a soluble or poorly soluble metal phosphate or complex phosphate. The soluble phosphate eluted from the inorganic coating film to defective regions in a coating film reacts with the metal of a plated steel sheet so as to form an insoluble phosphate, complementing the self-repairing function of valve metal imparted by the soluble fluoride. The poorly soluble phosphate is dispersed in the inorganic coating film so as to improve the strength of the coating film. Examples of the metal contained in the soluble metal phosphate or complex phosphate include an alkali metal, an alkali earth metal and Mn. Examples of the poorly soluble metal phosphate or complex phosphate include Al, Ti, Zr, Hf and Zn.

The inorganic coating film can be formed by a known method. For example, an inorganic coating material including a valve metal compound or the like may be applied on the surface of the hot-dip Al and Mg-containing Zn-plated steel sheet before or after contact with water vapor, and then dried without washing with water. Examples of the coating method include a roll coating method, a spin coating method, and a spraying method. In the case where the valve metal compound is added to the inorganic coating material, an organic acid having chelating function may be added to the inorganic coating material so that the valve metal compound can stably be present in the inorganic coating material. Examples of the organic acid include tannic acid, tartaric acid, citric acid, oxalic acid, malonic acid, lactic acid, and acetic acid.

(Organic Resin Coating Film)

The organic resin for constituting the organic resin coating film may be a urethane-based resin, an epoxy-based resin, an olefin-based resin, a styrene-based resin, a polyester-based resin, an acrylic-based resin, a fluorine-based resin, a combination of these resins, or a copolymer or a modified product of these resins. The use of these organic resins having flexibility prevents occurrence of cracks during production of a black-plated steel sheet, improving the corrosion resistance. Further, the valve metal compounds included in the organic resin film can be dispersed in the organic resin film (organic resin matrix), as described in the following.

Preferably the organic resin coating film includes a lubricant. Inclusion of a lubricant reduces the friction between a mold and the surface of a plated steel sheet during processing such as pressing so that galling of the plated steel sheet can be suppressed (improvement in galling resistance). The type of lubricant is not specifically limited and may be selected from known lubricants. Examples of the lubricants include an organic wax such as a fluorine-based wax, a polyethylene-based wax, and a styrene-based wax, and an inorganic lubricant such as molybdenum disulfide and talc.

Similarly to an inorganic coating film, the organic resin coating film preferably includes the valve metal compounds described above. Inclusion of a valve metal compound reduces an environmental load and imparts excellent barrier function.

Similarly to an inorganic coating film, the organic resin coating film may further include a soluble or poorly soluble metal phosphate or complex phosphate. The soluble phosphate eluted from the organic coating film to defective regions in a coating film reacts with the metal of a plated steel sheet so as to form an insoluble phosphate, complementing the self-repairing function of valve metal imparted by the soluble fluoride. The poorly soluble phosphate is dispersed in the organic coating film so as to improve the strength of the coating film.

The organic resin coating film including a valve metal compound and a phosphate usually allows for formation of an interface reaction layer between a plated steel sheet and the organic resin coating film. The interface reaction layer is a dense layer formed of zinc fluoride, zinc phosphate, and a fluoride of valve metal or a phosphate which are reaction products of a fluoride or a phosphate contained in an organic coating material with metals contained in the plated steel sheet or a valve metal. The interface reaction layer has excellent environment blocking capability, preventing corrosive components in atmosphere from reaching the plated steel sheet. Meanwhile, the organic resin coating film includes particles of oxide of valve metal, hydroxide of valve metal, fluoride of valve metal and phosphate, which are dispersed in an organic resin matrix. Since the particles of oxides of valve metal etc. are three-dimensionally dispersed in an organic resin matrix, the corrosive components such as moisture passing through the organic resin matrix can be captured. As a result, the organic resin coating film substantially reduces corrosive components reaching the interface reaction layer. Owing to the organic resin coating film and the interface reaction layer, excellent anti-corrosion effect can be achieved.

The organic resin coating film may be, for example, a urethane-based resin coating film which contains urethane based resin having excellent flexibility. The urethane-based resin for constituting the urethane-based resin coating film may be obtained by reacting polyol with polyisocyanate. In the case of treating with water vapor for blackening after formation of the urethane-based resin coating film, the polyol for use preferably includes a combination of an ether-based polyol (polyol having an ether bond) and an ester-based polyol (polyol having an ester bond) at a predetermined ratio.

A urethane-based resin coating film formed of ester-based polyol alone as polyol allows ester bonds in the urethane-based resin to be hydrolyzed by water vapor, so that the corrosion resistance cannot be sufficiently improved. On the other hand, a urethane-based resin coating film formed of ether-based polyol alone as polyol has insufficient adhesion to a plated steel sheet, so that the corrosion resistance cannot be sufficiently improved. In contrast, the present inventors found that use of the combination of an ether-based polyol and an ester-based polyol at a predetermined ratio markedly improves the corrosion resistance of a plated steel sheet, with making effective use of the advantages of both an ether-based polyol and an ester-based polyol, complementing the disadvantages of each other. The effect of the urethane-based resin coating film for improving the corrosion resistance can be thereby maintained even when treated with water vapor to impart black color after formation of the urethane-based resin coating film. A black-plated steel sheet which has black color and excellent corrosion resistance can be thus produced.

The type of the ether-based polyol is not specifically limited, and may be properly selected from known ones. Examples of the ether-based polyol include polyethylene glycol, polypropylene glycol, and a straight chain polyalkylene polyol such as an ethylene oxide or propylene oxide adduct of glycerin.

The type of the ester-based polyol is also not specifically limited, and may be properly selected from known ones. The ester-based polyol for use may be, for example, a linear polyester having a hydroxyl group in a molecular chain which is obtained by the reaction of dibasic acid with low-molecular weight polyol. Examples of the dibasic acid include adipic acid, azelaic acid, dodecanedioic acid, dimer acid, isophthalic acid, hexahydro phthalic anhydride, terephthalic acid, dimethyl terephthalate, itaconic acid, fumaric acid, maleic anhydride, and esters of each of the acids.

The proportion of the ether-based polyol in polyol formed of a combination of an ether-based polyol and an ester-based polyol is preferably in the range of 5 to 30 mass %. A proportion of the ether-based polyol less than 5 mass % results in excessively increased proportion of the ester-based polyol, so that the urethane-based resin coating film is easily hydrolyzed. Consequently the corrosion resistance may not be sufficiently improved. On the other hand, a proportion of the ether-based polyol more than 30 mass % results in excessively increased proportion of the ether-based polyol, so that the adhesion to a plated steel sheet is reduced. Consequently the corrosion resistance may not be sufficiently improved.

The type of polyisocyanate is not specifically limited, and may be properly selected from known ones. The polyisocyanate for use may be, for example, a polyisocyanate compound having an aromatic ring. Examples of the polyisocyanate compounds having an aromatic ring include hexamethylene diisocyanate, o-, m-, or p-phenylene diisocyanate, 2,4- or 2,6-tolylene diisocyanate, 2,4- or 2,6-tolylene diisocyanate having a hydrogenated aromatic ring, diphenylmethane-4,4'-diisocyanate, 3,3'-dimethyl-4,4'-biphenylene diisocyanate, $\omega,\omega'$-diisocyanate-1,4-dimethylbenzene, and $\omega,\omega'$-diisocyanate-1,3-dimethylbenzene. These may be used alone or may be used in combination of two or more.

Preferably the urethane-based resin coating film further includes a polyvalent phenol. A urethane-based resin coating film including a polyvalent phenol allows for formation of a layer of concentrated polyvalent phenol at the interface between a plated steel sheet and the polyvalent phenol so as to make strong adhesion between them. Accordingly, blending of polyvalent phenol in the urethane-based resin coating film further improves the corrosion resistance of the urethane-based resin coating film.

The type of polyvalent phenol is not specifically limited and may be properly selected from known ones. Examples of the polyvalent phenol include tannic acid, gallic acid, hydroquinone, catechol, and phloroglucinol. The amount of blended polyvalent phenol in the urethane-based resin coating film is preferably in the range of 0.2 to 30 mass %. An amount of the blended polyvalent phenol less than 0.2 mass % has insufficient effect of the polyvalent phenol. On the other hand, with an amount of the blended polyvalent phenol more than 30 mass %, the stability of the coating material may be reduced.

The organic resin coating film may be a coating layer or a laminate layer. The organic resin coating film is preferably a clear coating film for taking advantage of the black appearance of the black-plated steel sheet.

The organic coating film may be formed by a known method. For example, in the case of the organic resin coating film formed of a coating layer, an organic coating material which contains an organic resin and a valve metal etc. may be applied to the surface of a hot-dip Al and Mg-containing Zn-plated steel sheet before or after contact with water vapor, and then dried without washing with water. Examples of the application method include a roll coating method, a spin coating method, and a spray coating method. In the case of adding a valve metal compound to an organic coating material, an organic acid having a chelating function may be added to the organic coating material so that the valve metal compound can stably exist in the organic coating material. In the case of application of an organic coating material which contains an organic resin, a valve metal compound, a fluoride, and a phosphate to the surface of a plated steel sheet, a coating film (interface reaction layer) consisting of a reaction product of inorganic negative ions such as fluorine ions and phosphoric ions with metals contained in the plated steel sheet or a valve metal is preferentially and densely formed on the surface of the plated steel sheet, on which an organic resin coating film including dispersed particles of oxides of valve metal, hydroxides of valve metal, fluorides of valve metal and phosphates is formed. In contrast, in the case of the organic resin coating film formed of a laminate layer, an organic resin film which contains a valve metal or the like may be laminated on the surface of a plated steel sheet.

According to the procedures described above, a plating layer can be blackened to produce a black-plated steel sheet excellent in retention of the black appearance and press formability.

The production method of the present invention uses water vapor for blackening, so that a black-plated steel sheet can be produced without placing a load to the environment.

Moreover, in the black-plated steel sheet obtained by the production method of the present invention, the black oxide imparting a color tone of black is present not only at the surface of the plating layer but also inside the plating layer. Thus, the black-plated steel sheet obtained by the production method of the present invention can maintain the black appearance even when the surface of the plating layer is scraped and exhibits an excellent ability to maintain a black appearance.

Moreover, in the black-plated steel sheet obtained by the production method of the present invention, the black oxide imparting a color tone of black is dispersed in the plating layer without forming a single film. Thus, the black-plated steel sheet obtained by the production method of the present invention has excellent press formability without reduction in adhesion of the plating layer. As a matter of course, the black-plated steel sheet obtained by the production method of the present invention has an excellent corrosion resistance similar to the corrosion resistance of a usual hot-dip Al and Mg-containing Zn-plated steel sheet.

Moreover, the black-plated steel sheet obtained by the production method of the present invention does not have a coating film, and therefore spot welding can also be conducted in the same manner as in a usual hot-dip Al and Mg-containing Zn-plated steel sheet.

2. Method for Producing Formed Article of Black-Plated Steel Sheet

The method for producing a formed article of the black plated steel sheet of the present invention includes 1) providing a hot-dip Al and Mg-containing Zn-plated steel sheet, 2) contacting the hot-dip Al and Mg-containing Zn-plated steel sheet with water vapor in a closed vessel, and 3) forming the hot-dip Al and Mg-containing Zn-plated steel sheet before or after 2).

[First step and Second step]

The above first step and second step are the same as the first step and the second step of the above-described method for producing a black-plated steel sheet.

[Third Step]

The hot-dip Al and Mg-containing Zn-plated steel sheet is formed in the third step which is conducted before or after the second step. Specifically, in the case where the third step is conducted after the second step, the black-plated steel sheet contacted with water vapor is formed to obtain a formed article of the black-plated steel sheet. On the other hand, in the case where the third step is conducted before the second step, the plated steel sheet before being contacted with water vapor is formed. In this case, the formed article of the plated steel sheet is blackened by contacting the formed article of the plated steel sheet with water vapor in the second step conducted after forming.

The method for forming the hot-dip Al and Mg-containing Zn-plated steel sheet is not particularly limited and can appropriately be selected from known methods such as a pressing, punching, and drawing methods.

The formed article of the black-plated steel sheet exhibiting an excellent ability to maintain a black appearance and an excellent press formability can be produced by the above procedures.

In the production method of the present invention, blackening is conducted using water vapor, and therefore the formed article of the black-plated steel sheet can be produced without applying a load to the environment.

Moreover, in the formed article of the black-plated steel sheet obtained by the production method of the present invention, the black oxide imparting a color tone of black is present not only at the surface of the plating layer but also inside the plating layer. Thus, the formed article of the black-plated steel sheet obtained by the production method of the present invention can maintain the black appearance even when the surface of the plating layer is scraped and exhibits an excellent ability to maintain a black appearance.

Moreover, the formed article of the black-plated steel sheet obtained by the production method of the present invention does not have a coating film, and therefore spot welding can also be conducted in the same manner as in a usual formed article of the hot-dip Al and Mg-containing Zn-plated steel sheet.

EXAMPLES

The following examples further illustrate the present invention, but the scope of the present invention is not limited to the examples.

Experimental Example 1

A hot-dip Al and Mg-containing Zn-plated steel sheet having a plating layer with a thickness of 3 to 100 μm was prepared from a substrate of SPCC with a sheet thickness of 1.2 mm. The plating bath composition (concentration of Zn, Al, Mg, Si, Ti and B) was changed to prepare 30 kinds of plated steel sheets, each of which had a plating layer with a different composition and a different thickness. The plating bath composition and the plating layer thickness for each of the 30 kinds of prepared plated steel sheets are shown in Table 1. The plating bath composition and the plating layer composition are the same.

TABLE 1

| Plated steel sheet No. | Plating bath composition (mass %) | | | | | Plating layer thickness (μm) |
| --- | --- | --- | --- | --- | --- | --- |
| | Al | Mg | Si | Ti | B | |
| 1 | 1.0 | 3.0 | — | — | — | 10 |
| 2 | 6.0 | 3.0 | — | — | — | |

TABLE 1-continued

| Plated steel sheet No. | Plating bath composition (mass %) | | | | | Plating layer thickness (μm) |
|---|---|---|---|---|---|---|
| | Al | Mg | Si | Ti | B | |
| 3 | 11.0 | 3.0 | 0.200 | — | — | |
| 4 | 6.0 | 1.5 | — | — | — | |
| 5 | 22.0 | 3.0 | — | — | — | |
| 6 | 2.3 | 2.3 | 0.005 | — | — | |
| 7 | 3.8 | 3.2 | 0.005 | — | — | |
| 8 | 6.0 | 6.0 | — | — | — | |
| 9 | 6.0 | 10.0 | — | — | — | |
| 10 | 6.0 | 3.0 | 0.005 | — | — | |
| 11 | 6.0 | 3.0 | 0.020 | — | — | |
| 12 | 6.0 | 3.0 | 2.000 | — | — | |
| 13 | 6.0 | 3.0 | — | 0.001 | — | |
| 14 | 6.0 | 3.0 | — | 0.020 | — | |
| 15 | 6.0 | 3.0 | — | 0.100 | — | |
| 16 | 6.0 | 3.0 | — | — | 0.0005 | |
| 17 | 6.0 | 3.0 | — | — | 0.045 | |
| 18 | 6.0 | 3.0 | — | 0.001 | 0.0005 | |
| 19 | 6.0 | 3.0 | — | 0.001 | 0.045 | |
| 20 | 6.0 | 3.0 | — | 0.100 | 0.0005 | |
| 21 | 6.0 | 3.0 | — | 0.100 | 0.045 | |
| 22 | 6.0 | 3.0 | 0.020 | 0.020 | — | |
| 23 | 6.0 | 3.0 | 0.020 | 0.020 | 0.0005 | |
| 24 | 6.0 | 3.0 | 0.020 | 0.020 | — | 3 |
| 25 | 6.0 | 3.0 | 0.020 | 0.020 | — | 20 |
| 26 | 6.0 | 3.0 | 0.020 | 0.020 | — | 100 |
| 27 | — | 3.0 | — | — | — | 10 |
| 28 | 30.0 | 3.0 | — | — | — | |
| 29 | 6.0 | — | — | — | — | |
| 30 | 6.0 | 15.0 | — | — | — | |

FIG. 1A is an electron microscopic photograph illustrating a cross section of the plating layer of the plated steel sheet No. 2. In FIG. 1A, "A" denotes a part corresponding to the primary Al", and "B" denotes a part corresponding to the ternary eutectic structure of Al/Zn/Zn$_2$Mg.

The one piece of prepared plated steel sheet was placed in a high-temperature and high-pressure heat-moisture treatment apparatus (Hisaka Works, Ltd.) to contact the plating layer with water vapor under the conditions shown in Tables 2 to 4. In high-temperature and high-pressure heat-moisture treatment, the conditions to contact the hot-dip Al and Mg-containing Zn-plated steel sheet with water vapor were managed and measured in the following manner. Regarding the temperature, a thermocouple with a protection tube was inserted near the hot-dip Al and Mg-containing Zn-plated steel sheet placed in the high-temperature and high-pressure heat-moisture treatment apparatus, and the value indicated by the thermocouple was recorded. The relative humidity was measured by a wet-bulb thermometer. Regarding the absolute pressure, a small pressure gauge of current signal conversion system was attached at the top section of the high-temperature and high-pressure heat-moisture treatment apparatus, and the value indicated by the pressure gauge was recorded. An auxiliary tank communicating with the high-temperature and high-pressure heat-moisture treatment apparatus through a valve and a pipe was installed for the purpose of measuring an oxygen concentration. The auxiliary tank includes a heating mechanism and a cooling mechanism as the high-temperature and high-pressure heat-moisture treatment apparatus (main body) does. The valve was opened and the atmosphere of the main body was fractionated to the auxiliary tank through the communicating pipe while the temperature of the auxiliary tank was maintained to be the same as that of the main body. Thereafter, the valve was closed, only the auxiliary tank was cooled to normal temperature to condense water vapor, thereby the amount of water vapor was measured as the amount of water, and the residual gas was analyzed to quantitatively determine the oxygen concentration in the auxiliary tank. The oxygen concentration quantitatively determined was converted to the oxygen concentration in the main body by determining the water vapor concentration in the main body from the measured amount of water.

FIG. 1B is an electron microscope photograph illustrating a cross section of the plating layer of the plated steel sheet of Example 5 after the water vapor treatment. In FIG. 1B, "A" denotes a part corresponding to the primary Al", and "B" denotes a part corresponding to the ternary eutectic structure of Al/Zn/Zn$_2$Mg. In FIG. 1B, for convenience of description, the region of oxidized metal is also classified into the same group as before oxidation (a ternary eutectic structure of Al/Zn/Zn$_2$Mg and a primary Al") in the drawing. In comparison between FIG. 1A and FIG. 1B, it is shown that changes occurred mainly in the Al phase.

Figure 2B:
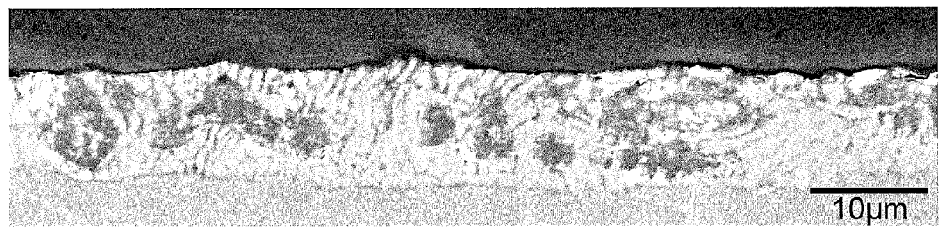
FIG. 2B is a scanning electron microscopic image of a cross section in the same view field as in FIG. 2A.

FIG. 2A is an optical microscopic image of the cross section of plating layer of the plated steel sheet after water vapor treatment in Example 5. FIG. 2B is a scanning electron microscopic image of a cross section in the same view field as in FIG. 2A. As illustrated in the photographs, black oxides exist not only at the surface but also in the interior of the plating layer. It was observed that in each of the plating layers of the plated steel sheets in other Examples (Examples 1 to 4, and 6 to 50), black oxides existed in the interior of the plating layer.

The lightness (L* value) of a plating layer surface was measured for each of the plated steel sheets after water vapor treatment (Examples 1 to 50, and Comparative Examples 1 to 11) by spectral reflectance with a spectroscopic color difference meter (TC-1800, made by Tokyo Denshoku Co., Ltd.), in accordance with JIS K 5600. The measurement conditions are shown in the following:

Optical conditions: d/8° method (double beam optical system)
Visual field: 2 degrees
Measurement method: reflectometry
Standard light: C
Color system: CIELAB
Measurement wavelength: 380 to 780 nm
Measurement wavelength interval: 5 nm
Spectroscope: diffraction grating 1,200/mm
Lighting: halogen lamp (voltage: 12 V, power: 50 W, rated life: 2,000 hours)
Measurement area: diameter=7.25 mm
Detection element: photomultiplier (R928 made by Hamamatsu Photonics K.K.)
Reflectance: 0 to 150%
Measurement temperature: 23° C.
Standard plate: white For each of the plated steel sheets after water vapor treatment (Examples 1 to 50 and Comparative Examples 1 to 11), having an L* value of 35 or less was evaluated as "A", more than 35 and 40 or less as "B", more than 40 and 60 or less as "C", and more than 60 as "D".

The corrosion resistance was evaluated for each of the plated steel sheets after water vapor treatment (Examples 1 to 50 and Comparative Examples 1 to 11). After sealing the end faces of a sample piece (150 mm long and 70 mm wide) cut out from each of the plated steel sheets, the sample piece was subjected to repeated cycles including a salt water spraying step, a drying step, and a moistening step in one cycle (8 hours). Evaluation was made based on the number of cycles when the proportion of red-rusted area reached 5%. In the salt water spraying step, 5% NaCl aqueous solution having a temperature of 35° C. was sprayed to the sample piece for 2 hours. In the drying step, the sample piece was left standing for 4 hours in an environment at an atmospheric temperature of 60° C. and a relative humidity of 30%. In the moistening step, the sample piece was left standing for 2 hours in an environment at an atmospheric temperature of 50° C. and a relative humidity of 95%. The sample piece which requires more than 120 cycles for the proportion of red-rusted area to reach 5% was evaluated as "A", 70 cycles or more and 120 or less as "B", and 70 cycles or less as "D".

The lightness and the results of corrosion resistance testing for the plating layer surface of each of the plated steel sheets after water vapor treatment are shown in Tables 2 to 4.

TABLE 2

| | | Conditions for contacting with water vapor | | | | | Blackness | Corrosion resistance |
| --- | --- | --- | --- | --- | --- | --- | --- | --- |
| | Plated steel sheet (refer to Table 1) | Temperature (° C.) | Relative humidity (%) | Atmosphere gas | Oxygen concentration (%) | Absolute pressure (MPa) | Treatment time (hour) | degree Lightness (L* value) | Cycle number (repeat count) |
| Example 1 | 1 | 140 | 95 | None | 1 | 0.34 | 6 | 34(A) | 95(B) |
| Example 2 | 1 | 95 | 95 | Ar | 2 | 0.10 | 140 | 37(B) | 95(B) |
| Example 3 | 2 | 105 | 97 | None | <1 | 0.12 | 48 | 32(A) | 120 < (A) |
| Example 4 | 2 | 140 | 95 | None | 1 | 0.34 | 6 | 30(A) | 120 < (A) |
| Example 5 | 2 | 120 | 85 | None | 1 | 0.17 | 20 | 32(A) | 120 < (A) |
| Example 6 | 2 | 140 | 95 | None | 1 | 0.34 | 2 | 37(B) | 120 < (A) |
| Example 7 | 2 | 140 | 95 | Ar | 1 | 0.70 | 2 | 32(A) | 120 < (A) |
| Example 8 | 2 | 190 | 30 | None | 4 | 0.40 | 8 | 32(A) | 120 < (A) |
| Example 9 | 2 | 150 | 80 | $O_2$ | 6 | 0.38 | 3 | 35(A) | 120 < (A) |
| Example 10 | 2 | 150 | 80 | $O_2$ | 10 | 0.39 | 3 | 40(B) | 120 < (A) |
| Example 11 | 2 | 150 | 80 | $O_2$ | 13 | 0.40 | 3 | 55(C) | 120 < (A) |
| Example 12 | 2 | 95 | 95 | $N_2$ | 2 | 0.10 | 140 | 33(A) | 120 < (A) |
| Example 13 | 2 | 95 | 95 | Ar | 2 | 0.10 | 140 | 32(A) | 120 < (A) |
| Example 14 | 2 | 95 | 95 | He | 2 | 0.10 | 140 | 33(A) | 120 < (A) |
| Example 15 | 3 | 140 | 95 | None | 1 | 0.34 | 6 | 29(A) | 120 < (A) |
| Example 16 | 3 | 150 | 85 | None | 1 | 0.41 | 2 | 31(A) | 120 < (A) |
| Example 17 | 3 | 200 | 100 | None | <1 | 1.64 | 0.25 | 29(A) | 120 < (A) |
| Example 18 | 3 | 350 | 100 | None | <1 | 18.0 | 0.25 | 27(A) | 120 < (A) |
| Example 19 | 3 | 95 | 95 | $N_2$ | 2 | 0.10 | 140 | 31(A) | 120 < (A) |
| Example 20 | 3 | 95 | 95 | Ar | 2 | 0.10 | 140 | 31(A) | 120 < (A) |
| Example 21 | 3 | 95 | 95 | Ar + $N_2$ | 2 | 0.10 | 140 | 32(A) | 120 < (A) |

TABLE 3

| | | Conditions for contacting with water vapor | | | | | Blackness | Corrosion resistance |
| --- | --- | --- | --- | --- | --- | --- | --- | --- |
| | Plated steel sheet (refer to Table 1) | Temperature (° C.) | Relative humidity (%) | Atmosphere gas | Oxygen concentration (%) | Absolute pressure (MPa) | Treatment time (hour) | degree Lightness (L* value) | Cycle number (repeat count) |
| Example 22 | 4 | 140 | 95 | None | 1 | 0.34 | 6 | 37(B) | 73(B) |
| Example 23 | 4 | 95 | 95 | Ar | 2 | 0.10 | 140 | 38(B) | 73(B) |
| Example 24 | 5 | 140 | 95 | None | 1 | 0.34 | 6 | 26(A) | 120 < (A) |
| Example 25 | 5 | 95 | 95 | Ar | 2 | 0.10 | 140 | 27(A) | 120 < (A) |
| Example 26 | 6 | 140 | 95 | None | 1 | 0.34 | 6 | 32(A) | 78(B) |
| Example 27 | 6 | 95 | 95 | Ar | 2 | 0.10 | 140 | 35(A) | 78(B) |
| Example 28 | 7 | 140 | 95 | None | 1 | 0.34 | 6 | 33(A) | 120 < (A) |
| Example 29 | 7 | 95 | 95 | Ar | 2 | 0.10 | 140 | 33(A) | 120 < (A) |
| Example 30 | 8 | 140 | 95 | None | 1 | 0.34 | 6 | 30(A) | 120 < (A) |
| Example 31 | 8 | 95 | 95 | Ar | 2 | 0.10 | 140 | 30(A) | 120 < (A) |
| Example 32 | 9 | 140 | 95 | None | 1 | 0.34 | 6 | 29(A) | 120 < (A) |
| Example 33 | 9 | 95 | 95 | Ar | 2 | 0.10 | 140 | 28(A) | 120 < (A) |
| Example 34 | 10 | 140 | 95 | None | 1 | 0.34 | 6 | 30(A) | 120 < (A) |
| Example 35 | 11 | 140 | 95 | None | 1 | 0.34 | 6 | 30(A) | 120 < (A) |
| Example 36 | 12 | 140 | 95 | None | 1 | 0.34 | 6 | 31(A) | 120 < (A) |
| Example 37 | 13 | 140 | 95 | None | 1 | 0.34 | 6 | 30(A) | 120 < (A) |
| Example 38 | 14 | 140 | 95 | None | 1 | 0.34 | 6 | 29(A) | 120 < (A) |
| Example 39 | 15 | 140 | 95 | None | 1 | 0.34 | 6 | 30(A) | 120 < (A) |
| Example 40 | 16 | 140 | 95 | None | 1 | 0.34 | 6 | 32(A) | 120 < (A) |
| Example 41 | 17 | 140 | 95 | None | 1 | 0.34 | 6 | 29(A) | 120 < (A) |

TABLE 4

| | Plated steel sheet (refer to Table 1) | Conditions for contacting with water vapor | | | | | | Blackness | Corrosion resistance |
| | | Temperature (° C.) | Relative humidity (%) | Atmosphere gas | Oxygen concentration (%) | Absolute pressure (MPa) | Treatment time (hour) | degree Lightness (L* value) | Cycle number (repeat count) |
|---|---|---|---|---|---|---|---|---|---|
| Example 42 | 18 | 140 | 95 | None | 1 | 0.34 | 6 | 30(A) | 120 < (A) |
| Example 43 | 19 | 140 | 95 | None | 1 | 0.34 | 6 | 31(A) | 120 < (A) |
| Example 44 | 20 | 140 | 95 | None | 1 | 0.34 | 6 | 30(A) | 120 < (A) |
| Example 45 | 21 | 140 | 95 | None | 1 | 0.34 | 6 | 29(A) | 120 < (A) |
| Example 46 | 22 | 140 | 95 | None | 1 | 0.34 | 6 | 30(A) | 120 < (A) |
| Example 47 | 23 | 140 | 95 | None | 1 | 0.34 | 6 | 31(A) | 120 < (A) |
| Example 48 | 24 | 140 | 95 | None | 1 | 0.34 | 6 | 30(A) | 120 < (A) |
| Example 49 | 25 | 140 | 95 | None | 1 | 0.34 | 6 | 30(A) | 120 < (A) |
| Example 50 | 26 | 140 | 95 | None | 1 | 0.34 | 6 | 29(A) | 120 < (A) |
| Comparative Example 1 | 27 | 140 | 95 | None | 1 | 0.34 | 6 | 38(B) | 60(D) |
| Comparative Example 2 | 27 | 95 | 95 | Ar | 2 | 0.10 | 140 | 38(B) | 60(D) |
| Comparative Example 3 | 28 | 140 | 95 | None | 1 | 0.34 | 6 | 25(A) | 120 < (A) |
| Comparative Example 4 | 28 | 95 | 95 | $N_2$ | 2 | 0.10 | 140 | 26(A) | 120 < (A) |
| Comparative Example 5 | 29 | 140 | 95 | None | 1 | 0.34 | 6 | 39(B) | 20(D) |
| Comparative Example 6 | 29 | 95 | 95 | Ar | 2 | 0.10 | 140 | 39(B) | 20(D) |
| Comparative Example 7 | 30 | 140 | 95 | None | 1 | 0.34 | 6 | 28(A) | 120 < (A) |
| Comparative Example 8 | 30 | 95 | 95 | Ar | 2 | 0.10 | 140 | 26(A) | 120 < (A) |
| Comparative Example 9 | 2 | 140 | 80 | $O_2$ | 15 | 0.60 | 6 | 62(D) | 120 < (A) |
| Comparative Example 10 | 2 | 140 | 80 | $O_2$ | 18 | 0.60 | 6 | 65(D) | 120 < (A) |
| Comparative Example 11 | 2 | 95 | 95 | $O_2$ | 20 | 0.10 | 140 | 71(D) | 120 < (A) |

As shown in Tables 2 to 4, the plated steel sheets in Comparative Examples 1 and 2 had inferior corrosion resistance due to the Al content lower than the lower limit in the plating layer. The plated steel sheets in Comparative Examples 5 and 6 had inferior corrosion resistance due to the Mg content lower than the lower limit in the plating layer. Each of the plated steel sheets in Comparative Examples 3, 4, 7 and 8 was not beautifully plated, since excessive generation of oxides (dross) at a plating bath surface during production of the plated steel sheet caused attachment of the dross to the plating layer surface, though having good corrosion resistance. In the plated steel sheets of Comparative Examples 9 to 11, the oxygen concentration during the water vapor treatment was high, and therefore blackening was not able to be conducted sufficiently. In contrast, the plated steel sheets of Examples 1 to 50 were sufficiently blackened and the corrosion resistance of the plating layers was favorable.

Moreover, the adhesion of the plating layer was also evaluated for each plated steel sheet after the water vapor treatment. The evaluation of the adhesion was conducted by cutting out a test piece from each plated steel sheet after the water vapor treatment, bending the test piece by 180° (3 t), and conducting a cellophane tape peeling test for the bent portion. In any of the plated steel sheets of Examples 1 to 50, the peeled area ratio was less than 10%, and it was confirmed that favorable processing adhesion was maintained even after the water vapor treatment.

It is understood from the above results that the method for producing a black-plated steel sheet of the present invention can produce a black-plated steel sheet exhibiting an excellent ability to maintain a black appearance, an excellent press formability and corrosion resistance.

Experimental Example 2

A hot-dip Al and Mg-containing Zn-plated steel sheet having a plating layer with a thickness of 10 μm was prepared from a substrate of SPCC with a sheet thickness of 1.2 mm. The plating bath composition (concentration of Zn, Al, Mg, Si and Ti) was changed to prepare 9 kinds of plated steel sheets, each of which had a plating layer with a different composition. The plating bath composition for each of the 9 kinds of prepared plated steel sheet is shown in Table 5. The plating bath composition and the plating layer composition are the same.

TABLE 5

| | Plating bath composition (mass %) | | | | Plating layer |
| Plated steel sheet No. | Al | Mg | Si | Ti | thickness (μm) |
|---|---|---|---|---|---|
| 31 | 6.0 | 3.0 | 0.020 | 0.020 | 10 |
| 32 | 11.0 | 3.0 | 0.200 | — | |
| 33 | 1.8 | 1.9 | 0.006 | 0.002 | |
| 34 | 2.3 | 2.3 | 0.005 | — | |
| 35 | 6.0 | 6.0 | — | — | |
| 36 | 6.0 | 10.0 | — | — | |
| 37 | 1.0 | 3.0 | — | — | |
| 38 | 15.0 | 3.0 | — | — | |
| 39 | 20.0 | 3.0 | — | — | |

Each of the prepared plated steel sheets was placed in an incubator (PV(H)-331; ESPEC CORP.) and was preheated in the atmosphere under the conditions shown in tables 6 and 7. Next, the preheated plated steel sheet was placed in the high-temperature and high-pressure heat-moisture treatment apparatus to contact the plating layer with water vapor under the conditions shown in Tables 6 and 7.

The surface lightness (L* value) of the plating layer for each plated steel sheet after the water vapor treatment (Examples 51 to 77) was measured using the spectroscopic color-difference meter. The corrosion resistance testing was also performed for each of the plated steel sheets after water vapor treatment (Examples 51 to 77). The lightness and the results of corrosion resistance testing for the plating layer surface of each of the plated steel sheets after water vapor treatment are shown in Tables 6 and 7.

Examples. It was therefore confirmed that the good adhesion in processing was kept after water vapor treatment.

It is understood from the above results that the time required for the water vapor treatment can be shortened by conducting preheating before the water vapor treatment.

Experimental Example 3

Figure 4:
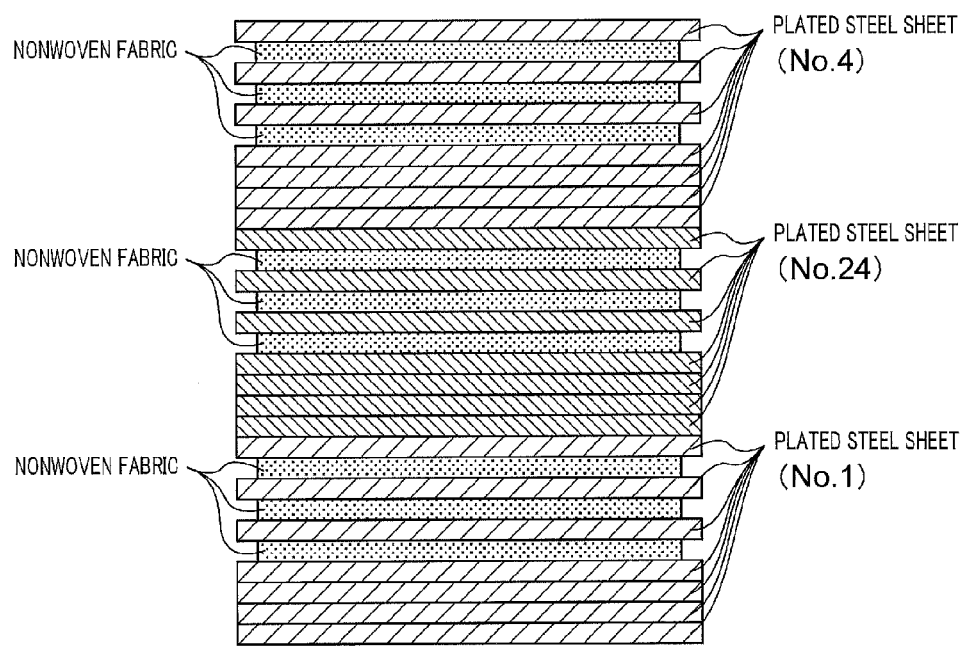
FIG. 4 is a schematic diagram illustrating a laminated form of plated steel sheets and spacers in Experimental Example 3.

From each of the plated steel sheets of Nos. 1, 4, and 24 in Table 1, 7 test pieces (500 mm×500 mm) were cut out. Moreover, from polypropylene nonwoven fabric having a thickness of about 0.7 mm, 9 planar spacers (450 mm×450 mm) were cut out. As illustrated in FIG. 4, a laminated body including 21 test pieces (plated steel sheets) and 9 spacers

TABLE 6

| | | Preheating | | Conditions for contacting with water vapor | | | | | | Blackness | Corrosion resistance |
|---|---|---|---|---|---|---|---|---|---|---|---|
| | | | | | | Oxygen | | | | | |
| | Plated steel sheet (refer to Table 5) | Temperature (° C.) | Time (hours) | Temperature (° C.) | Relative humidity (%) | Atmosphere gas | concentration (%) | Absolute pressure (MPa) | Treatment time (hour) | degree Lightness (L* value) | Cycle number (repeat count) |
| Example 51 | 31 | None | | 145 | 85 | None | 4 | 0.35 | 1 | 43(C) | 120 < (A) |
| Example 52 | 31 | None | | 95 | 95 | Ar | 1 | 0.10 | 48 | 47(C) | 120 < (A) |
| Example 53 | 31 | 200 | 10 | 145 | 85 | None | 4 | 0.35 | 1 | 31(A) | 120 < (A) |
| Example 54 | 31 | 250 | 6 | 95 | 95 | Ar | 1 | 0.10 | 48 | 33(A) | 120 < (A) |
| Example 55 | 31 | 250 | 6 | 145 | 85 | None | 4 | 0.35 | 1 | 30(A) | 120 < (A) |
| Example 56 | 31 | 250 | 2 | 145 | 85 | None | 4 | 0.35 | 1 | 38(B) | 120 < (A) |
| Example 57 | 31 | 250 | 1 | 145 | 85 | None | 4 | 0.35 | 1 | 42(C) | 120 < (A) |
| Example 58 | 32 | None | | 145 | 85 | None | 4 | 0.35 | 1 | 42(C) | 120 < (A) |
| Example 59 | 32 | None | | 95 | 95 | Ar | 1 | 0.10 | 48 | 44(C) | 120 < (A) |
| Example 60 | 32 | 200 | 10 | 145 | 85 | None | 4 | 0.35 | 1 | 28(A) | 120 < (A) |
| Example 61 | 32 | 250 | 6 | 95 | 95 | Ar | 1 | 0.10 | 48 | 30(A) | 120 < (A) |
| Example 62 | 33 | None | | 145 | 85 | None | 4 | 0.35 | 1 | 52(C) | 74(B) |
| Example 63 | 33 | 200 | 10 | 145 | 85 | None | 4 | 0.35 | 1 | 39(B) | 74(B) |
| Example 64 | 34 | None | | 145 | 85 | None | 4 | 0.35 | 1 | 45(C) | 78(B) |
| Example 65 | 34 | None | | 95 | 95 | Ar | 1 | 0.10 | 48 | 46(C) | 78(B) |
| Example 66 | 34 | 200 | 10 | 145 | 85 | None | 4 | 0.35 | 1 | 34(A) | 78(B) |
| Example 67 | 34 | 250 | 6 | 95 | 95 | Ar | 1 | 0.10 | 48 | 33(A) | 78(B) |
| Example 68 | 35 | None | | 145 | 85 | None | 4 | 0.35 | 1 | 44(C) | 120 < (A) |
| Example 69 | 35 | 200 | 10 | 145 | 85 | None | 4 | 0.35 | 1 | 32(A) | 120 < (A) |

TABLE 7

| | | Preheating | | Conditions for contacting with water vapor | | | | | | Blackness | Corrosion resistance |
|---|---|---|---|---|---|---|---|---|---|---|---|
| | | | | | | Oxygen | | | | | |
| | Plated steel sheet (refer to Table 5) | Temperature (° C.) | Time (hours) | Temperature (° C.) | Relative humidity (%) | Atmosphere gas | concentration (%) | Absolute pressure (MPa) | Treatment time (hour) | degree Lightness (L* value) | Cycle number (repeat count) |
| Example 70 | 36 | None | | 145 | 85 | None | 4 | 0.35 | 1 | 41(C) | 120 < (A) |
| Example 71 | 36 | 200 | 10 | 145 | 85 | None | 4 | 0.35 | 1 | 31(A) | 120 < (A) |
| Example 72 | 37 | None | | 145 | 85 | None | 4 | 0.35 | 1 | 49(C) | 95(B) |
| Example 73 | 37 | 200 | 10 | 145 | 85 | None | 4 | 0.35 | 1 | 36(B) | 95(B) |
| Example 74 | 38 | None | | 145 | 85 | None | 4 | 0.35 | 1 | 39(B) | 120 < (A) |
| Example 75 | 38 | 200 | 10 | 145 | 85 | None | 4 | 0.35 | 1 | 30(A) | 120 < (A) |
| Example 76 | 39 | None | | 145 | 85 | None | 4 | 0.35 | 1 | 39(B) | 120 < (A) |
| Example 77 | 39 | 200 | 10 | 145 | 85 | None | 4 | 0.35 | 1 | 29(A) | 120 < (A) |

As shown in Tables 6 and 7, the plated steel sheets preheated before water vapor treatment in Examples 53 to 57, 60, 61, 63, 66, 67, 69, 71, 73, 75 and 77 were sufficiently blackened in a shorter time in comparison with the ones without preheating. In evaluation of adhesion for each of the plated steel sheets after water vapor treatment, almost no peeling was found in any of the plated steel sheets in (nonwoven fabric) was formed. Looking at the plated steel sheet No. 1, there are 3 parts where the plated steel sheets are directly contacted with each other, and there are 3 parts where the spacer is held between the plated steel sheets. Also in each of the Nos. 4 and 24 plated steel sheets, there are 3 parts where the plated steel sheets are directly contacted with each other, and there are 3 parts where the spacer is held between the plated steel sheets.

The laminated body was placed in the high-temperature and high-pressure heat-moisture treatment apparatus, and the water vapor treatment was conducted under the conditions shown in Table 8.

TABLE 8

| Condition | Temperature (° C.) | Relative humidity (%) | Oxygen concentration (%) | Absolute pressure (MPa) | Treatment time (hour) |
|---|---|---|---|---|---|
| A | 115 | 95 | 1 | 0.17 | 34 |
| B |  |  |  |  | 24 |
| C |  | 85 |  | 0.15 | 36 |

The uniformity of blackening and the corrosion resistance were evaluated for each test piece after the water vapor treatment. First of all, the laminated body was disassembled, and, for each plated steel sheet, the test pieces (3 pieces in the lower side in FIG. 4) subjected to the water vapor treatment in a state where the spacer was not held between the plated steel sheets and the test pieces (3 pieces in the upper side in FIG. 4) subjected to the water vapor treatment in a state where the spacer was held between the plated steel sheets were taken out.

The lightness (L* value) at the peripheral parts (arbitrary 4 parts located at 20 mm inside from the edge per test piece) and the central parts (arbitrary 4 parts located near the center per test piece) was measured using the spectroscopic color-difference meter for each of the 3 test pieces the water vapor treatment conditions of which were the same. The average value of 3 pieces was calculated for each of the peripheral parts and the central parts. And the difference, ΔL* value, of the average value of the L* values at the central parts and the average value of the L* values at the peripheral parts was used as an evaluation index of the uniformity of blackening. Each test piece was evaluated as "A" in the case where the ΔL* value was 5 or less, "B" in the case where the ΔL* value was more than 5 and 10 or less, "C" in the case where the ΔL* value was more than 10 and 15 or less, and "D" in the case where the ΔL* value was more than 15.

Moreover, a 70 mm×150 mm test piece was cut out from the central part of each test piece, and the corrosion resistance was evaluated in the same procedures as in Experimental Example 1.

The surface lightness of the plating layer and the corrosion resistance test result for each test piece after the water vapor treatment are shown in Table 9.

TABLE 9

|  | Water vapor treatment Condition | Spacer | Plated steel sheet (refer to Table 1) | Blackness degree Peripheral part lightness (L* value) | Blackness degree Central part lightness (L* value) | Lightness difference (ΔL* value) | Corrosion resistance Cycle number (repeat count) |
|---|---|---|---|---|---|---|---|
| Example 78 | A | Present | 4 | 32 | 32 | 0(A) | 120 < (A) |
| Example 79 | A | Absent | 4 | 33 | 78 | 45(D) | 120 < (A) |
| Example 80 | A | Present | 24 | 30 | 30 | 0(A) | 120 < (A) |
| Example 81 | A | Absent | 24 | 30 | 78 | 48(D) | 120 < (A) |
| Example 82 | A | Present | 1 | 31 | 31 | 0(A) | 120 < (A) |
| Example 83 | A | Absent | 1 | 30 | 79 | 49(D) | 120 < (A) |
| Example 84 | B | Present | 4 | 35 | 35 | 0(A) | 120 < (A) |
| Example 85 | B | Absent | 4 | 36 | 78 | 42(D) | 120 < (A) |
| Example 86 | B | Present | 24 | 31 | 31 | 0(A) | 120 < (A) |
| Example 87 | B | Absent | 24 | 32 | 77 | 45(D) | 120 < (A) |
| Example 88 | B | Present | 1 | 32 | 33 | 1(A) | 120 < (A) |
| Example 89 | B | Absent | 1 | 31 | 77 | 46(D) | 120 < (A) |
| Example 90 | C | Present | 4 | 30 | 31 | 1(A) | 120 < (A) |
| Example 91 | C | Absent | 4 | 30 | 78 | 48(D) | 120 < (A) |
| Example 92 | C | Present | 24 | 31 | 32 | 1(A) | 120 < (A) |
| Example 93 | C | Absent | 24 | 31 | 77 | 46(D) | 120 < (A) |
| Example 94 | C | Present | 1 | 30 | 30 | 0(A) | 120 < (A) |
| Example 95 | C | Absent | 1 | 30 | 78 | 48(D) | 120 < (A) |

As shown in Table 9, in the test pieces (Examples 79, 81, 83, 85, 87, 89, 91, 93, and 95) each subjected to the water vapor treatment in a state where the spacer was not held between the plated steel sheets, the blackness at the peripheral parts was sufficient, however the blackness at the central parts was insufficient. The reason is considered that the test pieces are contacted with each other without a gap and a sufficient amount of water vapor was not able to reach the central parts. On the other hand, in the test pieces (Examples 78, 80, 82, 84, 86, 88, 90, 92, and 94) each subjected to the water vapor treatment in a state where the spacer was held between the plated steel sheets, not only the peripheral parts but also the central parts were sufficiently blackened, and the uniformity of blackening was also favorable. In these test pieces, traces of the spacer were not left.

It is understood from the above results that a black-plated steel sheet exhibiting an excellent appearance and an excellent corrosion resistance can be produced by holding the spacer between the plated steel sheets even in the case where the water vapor treatment is conducted simultaneously to a plurality of plated steel sheets.

Experimental Example 4

A hot-dip Al and Mg-containing Zn-plated steel sheet having a plating layer with a thickness of 10 μM was prepared from a substrate of SPCC with a sheet thickness of 1.2 mm. The plating bath composition (concentration of Zn, Al, Mg, Si, Ti and B) was changed to prepare 2 kinds of plated steel sheets, each of which had a plating layer with a different composition. The plating bath composition for each of the 2 kinds of prepared plated steel sheet is shown in Table 10. The plating bath composition and the plating layer composition are the same.

TABLE 10

| Plated steel sheet No. | Plating bath composition (mass %) | | | | | Plating layer thickness (μm) |
| --- | --- | --- | --- | --- | --- | --- |
| | Al | Mg | Si | Ti | B | |
| 40 | 6.0 | 3.0 | 0.020 | 0.020 | 0.0050 | 10 |
| 41 | 11.0 | 3.0 | 0.200 | 0.020 | — | 10 |

Each inorganic chemical treatment liquid shown in Table 11 was applied to the prepared plated steel sheet, and the plated steel sheet was put into an electric oven without washing with water, and then heated and dried in a condition where the end-point temperature of the plate was to be 120° C. to form an inorganic coating film on the surface of the plated steel sheet.

The plated steel sheet on which the inorganic coating film was formed was placed in the high-temperature and high-pressure heat-moisture treatment apparatus to contact the plating layer with water vapor under the conditions shown in Tables 12 and 13.

The surface lightness (L* value) of the plating layer for each plated steel sheet (Examples 96 to 127) after the water vapor treatment was measured using the spectroscopic color-difference meter. Moreover, the corrosion resistance test for each plated steel sheet (Examples 96 to 127) after the water vapor treatment was also conducted. The corrosion resistance test was conducted by spraying a NaCl aqueous solution having a temperature of 35° C. to the test piece for 12 hours in accordance with JIS Z2371. The case where the area ratio of the white rust generation after spraying was 0% was evaluated as "A," the case of more than 0% and 10% or less was evaluated as "B," the case of more than 10% and 20% or less was evaluated as "C," and the case of more than 20% was evaluated as "D."

The surface lightness of the plating layer and the corrosion resistance test result for each plated steel sheet after the water vapor treatment are shown in Tables 12 and 13.

TABLE 11

| Treatment liquid No. | Valve metal compound | | Phosphate | | Organic acid | |
| --- | --- | --- | --- | --- | --- | --- |
| | Type | Concentration (g/L) | Type | Concentration (g/L) | Type | Concentration (g/L) |
| 1 | $H_2TiF_6$ | Ti: 2 | $H_3PO_4$ | P: 4 | — | — |
| 2 | $(NH_4)_2TiF_6$ | Ti: 6 | $H_3PO_4$ | P: 4 | — | — |
| 3 | $H_2TiF_6$ | Ti: 8 | — | — | Tannic acid | 10 |
| 4 | $(NH_4)VO_3$ | V: 5 | — | — | — | — |
| 5 | $V_2O_5$ | V: 5 | $H_3PO_4$ | P: 4 | — | — |
| | $(NH_4)_2ZrO(CO_3)_2$ | Zr: 6 | | | | |
| 6 | $H_2ZrF_6$ | Zr: 6 | — | — | — | — |
| 7 | $Zr(SO_4)_2$ | Zr: 6 | — | — | — | — |
| 8 | $HfF_4$ | Hf: 1 | — | — | — | — |
| 9 | $H_2SiF_6$ | Si: 2 | $H_3PO_4$ | P: 4 | — | — |
| 10 | $Al(NO_3)_3 \cdot 9H_2O$ | Al: 1 | — | — | — | — |
| 11 | $(NH_4)_{10}W_{12}O_{41}$ | W: 3 | — | — | — | — |
| 12 | Niobic acid sol | Nb: 2 | — | — | Tartaric acid | 10 |
| 13 | $Ta_2O_5 \cdot nH_2O$ | Ta: 1 | — | — | — | — |
| 14 | $V_2O_5$ | V: 5 | $H_3PO_4$ | P: 4 | — | — |
| | $ZrO(NO_3)_2 \cdot 2H_2O$ | Zr: 6 | | | | |
| 15 | $ZrO(NO_3)_2 \cdot 2H_2O$ | Zr: 10 | — | — | — | — |

TABLE 12

| | Plated steel sheet (refer to Table 10) | Inorganic treatment | | Conditions for contacting with water vapor | | | | | Blackness | Corrosion resistance |
| | | Treatment liquid No. (refer to Table 11) | Attachment amount of valve metal (mg/m²) | Temperature (° C.) | Relative humidity (%) | Oxygen concentration (%) | Absolute pressure (MPa) | Treatment time (hour) | degree Lightness (L* value) | White-rusted area ratio (%) |
|---|---|---|---|---|---|---|---|---|---|---|
| Example 96 | 40 | 1 | Ti: 60 | 110 | 80 | 4 | 0.12 | 24 | 34(A) | 0(A) |
| Example 97 | | 2 | Ti: 70 | | | | | | 34(A) | 0(A) |
| Example 98 | | 3 | Ti: 80 | | | | | | 34(A) | 0(A) |
| Example 99 | | 4 | V: 50 | | | | | | 35(A) | 0(A) |
| Example 100 | | 5 | V: 50 Zr: 60 | | | | | | 34(A) | 0(A) |
| Example 101 | | 6 | Zr: 100 | | | | | | 35(A) | 0(A) |
| Example 102 | | 7 | Zr: 60 | | | | | | 36(B) | 0(A) |
| Example 103 | | 8 | Hf: 100 | | | | | | 34(A) | 0(A) |
| Example 104 | | 9 | Si: 200 | | | | | | 35(A) | 0(A) |
| Example 105 | | 10 | Al: 150 | | | | | | 36(B) | 0(A) |
| Example 106 | | 11 | W: 90 | | | | | | 34(A) | 0(A) |
| Example 107 | | 12 | Nb: 80 | | | | | | 35(A) | 0(A) |
| Example 108 | | 13 | Ta: 70 | | | | | | 34(A) | 0(A) |
| Example 109 | | 14 | V: 60 Zr: 72 | | | | | | 35(A) | 0(A) |
| Example 110 | | 15 | Zr: 100 | | | | | | 36(B) | 0(A) |
| Example 111 | | | None | | | | | | 32(A) | 70(D) |

TABLE 13

| | Plated steel sheet (refer to Table 10) | Inorganic treatment | | Conditions for contacting with water vapor | | | | | Blackness | Corrosion resistance |
| | | Treatment liquid No. (refer to Table 11) | Attachment amount of valve metal (mg/m²) | Temperature (° C.) | Relative humidity (%) | Oxygen concentration (%) | Absolute pressure (MPa) | Treatment time (hour) | degree Lightness (L* value) | White-rusted area ratio (%) |
|---|---|---|---|---|---|---|---|---|---|---|
| Example 112 | 41 | 1 | Ti: 60 | 110 | 80 | 4 | 0.12 | 24 | 33(A) | 0(A) |
| Example 113 | | 2 | Ti: 70 | | | | | | 35(A) | 0(A) |
| Example 114 | | 3 | Ti: 80 | | | | | | 35(A) | 0(A) |
| Example 115 | | 4 | V: 50 | | | | | | 34(A) | 0(A) |
| Example 116 | | 5 | V: 50 Zr: 60 | | | | | | 33(A) | 0(A) |
| Example 117 | | 6 | Zr: 100 | | | | | | 36(B) | 0(A) |
| Example 118 | | 7 | Zr: 60 | | | | | | 35(A) | 0(A) |
| Example 119 | | 8 | Hf: 100 | | | | | | 36(B) | 0(A) |
| Example 120 | | 9 | Si: 200 | | | | | | 37(B) | 0(A) |
| Example 121 | | 10 | Al: 150 | | | | | | 35(A) | 0(A) |
| Example 122 | | 11 | W: 90 | | | | | | 35(A) | 0(A) |
| Example 123 | | 12 | Nb: 80 | | | | | | 34(A) | 0(A) |
| Example 124 | | 13 | Ta: 70 | | | | | | 35(A) | 0(A) |
| Example 125 | | 14 | V: 60 Zr: 72 | | | | | | 34(A) | 0(A) |
| Example 126 | | 15 | Zr: 100 | | | | | | 33(A) | 0(A) |
| Example 127 | | | None | | | | | | 31(A) | 73(D) |

As shown in Tables 12 and 13, the plated steel sheets of Examples 96 to 110 and 112 to 126 on which the inorganic coating film was formed exhibited more excellent corrosion resistance as compared with the plated steel sheet of Examples 111 and 127 on which the inorganic coating film was not formed.

It is understood from the above results that the corrosion resistance of a black-plated steel sheet can be improved by forming the inorganic coating film.

Experimental Examples 5

The plated steel sheets No. 40 and No. 41 in Table 10 were placed in the high-temperature and high-pressure heat-moisture treatment apparatus, and the plating layer was contacted with water vapor under the conditions shown in Table 14 to obtain a black-plated steel sheet.

TABLE 14

| Black-plated steel sheet No. | Plated steel sheet (refer to Table 10) | Conditions for contacting with water vapor | | | | | Blackness degree Lightness (L* value) |
|---|---|---|---|---|---|---|---|
| | | Temperature (° C.) | Relative humidity (%) | Oxygen concentration (%) | Absolute pressure (MPa) | Treatment time (hour) | |
| A | 40 | 110 | 80 | 4 | 0.12 | 28 | 32(A) |
| B | 41 | 110 | 85 | 3 | 0.12 | 28 | 32(A) |

Each organic chemical treatment liquid shown in Table 15 was applied to the obtained black-plated steel sheet, and the black-plated steel sheet was put into an electric oven without washing with water, and then heated and dried in a condition where the end-point temperature of the plate was to be 160° C. to form an organic resin coating film on the surface of the plated steel sheet.

TABLE 15

| Treatment liquid No. | Organic resin | | Lubricant | Valve metal compound | | Phosphate | | Organic acid | |
|---|---|---|---|---|---|---|---|---|---|
| | Type | Concentration (g/L) | Concentration (g/L) | Type | Concentration (g/L) | Type | Concentration (g/L) | Type | Concentration (g/L) |
| 1 | Urethane resin | 100 | — | $H_2TiF_6$ | Ti: 1 | $H_3PO_4$ | P: 1 | — | — |
| 2 | Epoxy resin | 100 | — | $(NH_4)_2TiF_6$ | Ti: 1 | $H_3PO_4$ | P: 1 | — | — |
| 3 | Urethane resin | 100 | — | $H_2TiF_6$ | Ti: 1 | — | — | — | — |
| 4 | Acrylic resin | 100 | — | $(NH_4)VO_3$ | V: 1 | — | — | — | — |
| 5 | Urethane resin | 100 | — | $V_2O_5$ $(NH_4)_2ZrO(CO_3)_2$ | V: 1 Zr: 1 | $H_3PO_4$ | P: 1 | — | — |
| 6 | Urethane resin | 100 | 5 | $V_2O_5$ $(NH_4)_2ZrO(CO_3)_2$ | V: 1 Zr: 1 | $H_3PO_4$ | P: 1 | — | — |
| 7 | Polyolefin resin | 100 | — | $Zr(SO_4)_2$ | Zr: 1 | — | — | — | — |
| 8 | Acrylic resin | 100 | — | $HfF_4$ | Hf: 1 | — | — | — | — |
| 9 | Urethane resin | 100 | — | $H_2SiF_6$ | Si: 1 | $H_3PO_4$ | P: 1 | — | — |
| 10 | Fluorine resin | 100 | — | $Al(NO_3)_3 \cdot 9H_2O$ | Al: 1 | — | — | — | — |
| 11 | Polyester resin | 100 | — | — | — | — | — | Tannic acid | 10 |
| 12 | Urethane resin | 100 | — | Niobic acid sol | Nb: 1 | — | — | — | — |
| 13 | Urethane resin | 100 | — | $Ta_2O_5 \cdot nH_2O$ | Ta: 1 | — | — | — | — |
| 14 | Acrylic resin | 100 | — | $V_2O_5$ $ZrO(NO_3)_2 \cdot 2H_2O$ | V: 1 Zr: 1 | $H_3PO_4$ | P: 1 | — | — |
| 15 | Urethane resin | 100 | — | $ZrO(NO_3)_2 \cdot 2H_2O$ | Zr: 1 | — | — | — | — |

Lubricant: polyethylene-based wax (average particle diameter: 1.0 mm)

The corrosion resistance test and the galling resistance test were conducted for each plated steel sheet on which the organic resin coating film was formed and for each plated steel sheet on which the organic resin coating film was not formed (Examples 128 to 159). The corrosion resistance test was conducted by spraying a NaCl aqueous solution having a temperature of 35° C. to the test piece for 12 hours in accordance with JIS Z2371. In the galling resistance testing, a 30-mm by 250-mm sample piece was subjected to a bead drawing test (bead height: 4 mm, applied pressure: 3.0 kN), and the sliding surface was visually observed after testing. The sample piece with a proportion of scratched area in the sliding surface of 0% (no scratch) was evaluated as "A", more than 0% and less than 5% as "B", 5% or more and less than 10% as "C", and 10% or more as "D".

The results of the corrosion resistance testing and the galling resistance testing for each plated steel sheet are shown in Table 16.

TABLE 16

| | Black-plated steel sheet (refer to Table 14) | Organic treatment | | Corrosion resistance | Galling resistance |
|---|---|---|---|---|---|
| | | Treatment No. (refer to Table 15) | Film thickness (μm) | White-rusted area ratio (%) | Scratched area ratio (%) |
| Example 128 | A | 1 | 2 | 0(A) | 3(B) |
| Example 129 | | 2 | 2 | 0(A) | 9(C) |
| Example 130 | | 3 | 2 | 0(A) | 3(B) |
| Example 131 | | 4 | 2 | 0(A) | 6(C) |
| Example 132 | | 5 | 2 | 0(A) | 3(B) |
| Example 133 | | 6 | 2 | 0(A) | 0(A) |
| Example 134 | | 7 | 2 | 0(A) | 5(C) |
| Example 135 | | 8 | 2 | 0(A) | 6(C) |
| Example 136 | | 9 | 2 | 0(A) | 3(B) |
| Example 137 | | 10 | 2 | 0(A) | 2(B) |

TABLE 16-continued

|  | Black-plated steel sheet (refer to Table 14) | Organic treatment | | Corrosion resistance White-rusted area ratio (%) | Galling resistance Scratched area ratio (%) |
|---|---|---|---|---|---|
|  |  | Treatment No. (refer to Table 15) | Film thickness (μm) |  |  |
| Example 138 |  | 11 | 2 | 0(A) | 5(C) |
| Example 139 |  | 12 | 2 | 0(A) | 3(B) |
| Example 140 |  | 13 | 2 | 0(A) | 3(B) |
| Example 141 |  | 14 | 2 | 0(A) | 6(C) |
| Example 142 |  | 15 | 2 | 0(A) | 3(B) |
| Example 143 |  | None | | 70(D) | 90(D) |
| Example 144 | B | 1 | 2 | 0(A) | 3(B) |
| Example 145 |  | 2 | 2 | 0(A) | 8(C) |
| Example 146 |  | 3 | 2 | 0(A) | 3(B) |
| Example 147 |  | 4 | 2 | 0(A) | 6(C) |
| Example 148 |  | 5 | 2 | 0(A) | 4(B) |
| Example 149 |  | 6 | 2 | 0(A) | 0(A) |
| Example 150 |  | 7 | 2 | 0(A) | 5(C) |
| Example 151 |  | 8 | 2 | 0(A) | 6(C) |
| Example 152 |  | 9 | 2 | 0(A) | 4(B) |
| Example 153 |  | 10 | 2 | 0(A) | 2(B) |
| Example 154 |  | 11 | 2 | 0(A) | 5(C) |
| Example 155 |  | 12 | 2 | 0(A) | 3(B) |
| Example 156 |  | 13 | 2 | 0(A) | 3(B) |
| Example 157 |  | 14 | 2 | 0(A) | 5(C) |
| Example 158 |  | 15 | 2 | 0(A) | 3(B) |
| Example 159 |  | None | | 73(D) | 90(D) |

As shown in Table 16, the plated steel sheets of Examples 128 to 142 and 144 to 158 on which the organic resin coating film was formed exhibited more excellent corrosion resistance and galling resistance as compared with the plated steel sheet of Examples 143 and 159 on which the organic resin coating film was not formed.

It is understood from the above results that the corrosion resistance and the galling resistance of a black-plated steel sheet can be improved by forming the organic resin coating film.

Experimental Example 6

Plated steel sheet No. 40 or No. 41 in Table 10 was coated with an organic chemical treatment liquid shown in Table 17, and placed in an electric oven without washing with water so as to be heated and dried under conditions for the plate temperature to reach 160° C. Consequently an organic resin coating film (urethane-based resin costing film) was formed on the surface of the plated steel sheet. The ether-based polyol for use was polypropylene glycol. The ester-based polyol for use was adipic acid. The polyisocyanate for use was hydrogenated tolylenediisocyanate.

TABLE 17

| Treatment liquid No. | Urethane-based resin | | | Valve metal compound | | Phosphate | | Polyvalent phenol | |
|---|---|---|---|---|---|---|---|---|---|
|  | Polyol ratio (mass %) | | Concentration (g/L) | Type | Concentration (g/L) | Type | Concentration (g/L) | Type | Concentration (g/L) |
|  | Ether-based (polypropylene glycol) | Ester-based (adipic acid) | | | | | | | |
| 16 | 5 | 95 | 100 | — | — | — | — | — | — |
| 17 | 5 | 95 | 100 | $H_2TiF_6$ | Ti: 1 | $H_3PO_4$ | P: 1 | — | — |
| 18 | 5 | 95 | 100 | $(NH_4)VO_3$ | V: 1 | $H_3PO_4$ | P: 1 | — | — |
| 19 | 5 | 95 | 100 | $ZrO(NO_3)_2 \cdot 2H_2O$ | Zr: 1 | — | — | — | — |
| 20 | 5 | 95 | 100 | $HfF_4$ | Hf: 1 | — | — | — | — |
| 21 | 5 | 95 | 100 | $H_2SiF_6$ | Si: 1 | — | — | — | — |
| 22 | 5 | 95 | 100 | Niobic acid sol | Nb: 1 | — | — | — | — |
| 23 | 5 | 95 | 100 | $Al(NO_3)_3 \cdot 9H_2O$ | Al: 1 | — | — | — | — |
| 24 | 5 | 95 | 100 | $Ta_2O_5 \cdot nH_2O$ | Ta: 1 | — | — | — | — |
| 25 | 5 | 95 | 100 | $V_2O_5$ | V: 1 | $H_3PO_4$ | P: 1 | — | — |
| 26 | 5 | 95 | 100 | — | — | — | — | Tannic acid | 10 |
| 27 | 30 | 70 | 100 | — | — | — | — | — | — |
| 28 | 30 | 70 | 100 | $(NH_4)VO_3$ | V: 1 | $H_3PO_4$ | P: 1 | — | — |
| 29 | 30 | 70 | 100 | $V_2O_5$ | V: 1 | $H_3PO_4$ | P: 1 | — | — |
| 30 | 30 | 70 | 180 | $ZrO(NO_3)_2 \cdot 2H_2O$ | Zr: 1 | — | — | — | — |
| 31 | 30 | 70 | 100 | — | — | — | — | Tannic acid | 10 |
| 32 | 0 | 100 | 100 | — | — | — | — | — | — |
| 33 | 0 | 100 | 100 | $(NH_4)VO_3$ | V: 1 | $H_3PO_4$ | P: 1 | — | — |
| 34 | 0 | 100 | 100 | $V_2O_5$ | V: 1 | $H_3PO_4$ | P: 1 | — | — |
| 35 | 0 | 100 | 100 | $ZrO(NO_3)_2 \cdot 2H_2O$ | Zr: 1 | — | — | — | — |
| 36 | 0 | 100 | 100 | — | — | — | — | Tannic acid | 10 |
| 37 | 2 | 98 | 100 | — | — | — | — | — | — |

TABLE 17-continued

| | Urethane-based resin | | | Valve metal compound | | Phosphate | | Polyvalent phenol | |
|---|---|---|---|---|---|---|---|---|---|
| | Polyol ratio (mass %) | | Concentration (g/L) | | Concentration (g/L) | | Concentration (g/L) | | Concentration (g/L) |
| Treatment liquid No. | Ether-based (polypropylene glycol) | Ester-based (adipic acid) | | Type | | Type | | Type | |
| 38 | 35 | 65 | 100 | — | — | — | — | — | — |
| 39 | 2  | 98 | 100 | — | — | — | — | Tannic acid | 10 |
| 40 | 35 | 65 | 100 | — | — | — | — | Tannic acid | 10 |

The plated steel sheet having the organic resin coating film was placed in a high-temperature and high-pressure heat-moisture treatment apparatus, and the plating layer was contacted with water vapor under the conditions shown in Tables 18 and 19.

The surface lightness (L* value) of the plating layer for each plated steel sheet (Examples 160 to 209) after the water vapor treatment was measured using the spectroscopic color-difference meter. Moreover, the corrosion resistance test was also conducted for each plated steel sheet (Examples 160 to 209) after the water vapor treatment.

The surface lightness of the plating layer and the corrosion resistance test result for each plated steel sheet after the water vapor treatment are shown in Tables 18 and 19.

TABLE 18

| | Organic treatment | | | Conditions for contacting with water vapor | | | | | | Corrosion resistance |
|---|---|---|---|---|---|---|---|---|---|---|
| | Plated steel sheet (refer to Table 10) | Treatment liquid No. (refer to Table 17) | Film thickness (μm) | Temperature (° C.) | Relative humidity (%) | Oxygen concentration (%) | Absolute pressure (MPa) | Treatment time (hour) | Blackness degree Lightness (L* value) | White-rusted area ratio (%) |
| Example 160 | 40 | 16 | 2 | 110 | 90 | 4 | 0.13 | 21 | 31(A) | 9(C) |
| Example 161 | | 17 | 2 | | | | | | 32(A) | 4(B) |
| Example 162 | | 18 | 2 | | | | | | 32(A) | 3(B) |
| Example 163 | | 19 | 2 | | | | | | 31(A) | 4(B) |
| Example 164 | | 20 | 2 | | | | | | 32(A) | 4(B) |
| Example 165 | | 21 | 2 | | | | | | 32(A) | 4(B) |
| Example 166 | | 22 | 2 | | | | | | 31(A) | 3(B) |
| Example 167 | | 23 | 2 | | | | | | 31(A) | 4(B) |
| Example 168 | | 24 | 2 | | | | | | 33(A) | 4(B) |
| Example 169 | | 25 | 2 | | | | | | 32(A) | 3(B) |
| Example 170 | | 26 | 2 | | | | | | 33(A) | 0(A) |
| Example 171 | | 27 | 2 | | | | | | 31(A) | 9(C) |
| Example 172 | | 28 | 2 | | | | | | 31(A) | 3(B) |
| Example 173 | | 29 | 2 | | | | | | 31(A) | 3(B) |
| Example 174 | | 30 | 2 | | | | | | 30(A) | 3(B) |
| Example 175 | | 31 | 2 | | | | | | 30(A) | 0(A) |
| Example 176 | | 32 | 2 | | | | | | 33(A) | 20(D) |
| Example 177 | | 33 | 2 | | | | | | 32(A) | 15(D) |
| Example 178 | | 34 | 2 | | | | | | 33(A) | 14(D) |
| Example 179 | | 35 | 2 | | | | | | 31(A) | 15(D) |
| Example 180 | | 36 | 2 | | | | | | 31(A) | 13(D) |
| Example 181 | | 37 | 2 | | | | | | 33(A) | 15(D) |
| Example 182 | | 38 | 2 | | | | | | 32(A) | 15(D) |
| Example 183 | | 39 | 2 | | | | | | 33(A) | 10(D) |
| Example 184 | | 40 | 2 | | | | | | 31(A) | 10(D) |

TABLE 19

| | Organic treatment | | | Conditions for contacting with water vapor | | | | | | Corrosion resistance |
|---|---|---|---|---|---|---|---|---|---|---|
| | Plated steel sheet (refer to Table 10) | Treatment liquid No. (refer to Table 17) | Film thickness (μm) | Temperature (° C.) | Relative humidity (%) | Oxygen concentration (%) | Absolute pressure (MPa) | Treatment time (hour) | Blackness degree Lightness (L* value) | White-rusted area ratio (%) |
| Example 185 | 41 | 16 | 2 | 110 | 90 | 4 | 0.13 | 21 | 32(A) | 8(C) |
| Example 186 | | 17 | 2 | | | | | | 31(A) | 4(B) |
| Example 187 | | 18 | 2 | | | | | | 33(A) | 4(B) |
| Example 188 | | 19 | 2 | | | | | | 32(A) | 3(B) |
| Example 189 | | 20 | 2 | | | | | | 33(A) | 3(B) |
| Example 190 | | 21 | 2 | | | | | | 30(A) | 3(B) |
| Example 191 | | 22 | 2 | | | | | | 32(A) | 4(B) |
| Example 192 | | 23 | 2 | | | | | | 31(A) | 3(B) |
| Example 193 | | 24 | 2 | | | | | | 30(A) | 3(B) |

TABLE 19-continued

| | Plated steel sheet (refer to Table 10) | Organic treatment | | Conditions for contacting with water vapor | | | | | Corrosion |
| | | Treatment liquid No. (refer to Table 17) | Film thickness (μm) | Temperature (° C.) | Relative humidity (%) | Oxygen concentration (%) | Absolute pressure (MPa) | Treatment time (hour) | Blackness degree Lightness (L* value) | resistance White-rusted area ratio (%) |
| --- | --- | --- | --- | --- | --- | --- | --- | --- | --- | --- |
| Example 194 | | 25 | 2 | | | | | | 32(A) | 4(B) |
| Example 195 | | 26 | 2 | | | | | | 33(A) | 0(A) |
| Example 196 | | 27 | 2 | | | | | | 32(A) | 8(C) |
| Example 197 | | 28 | 2 | | | | | | 33(A) | 4(B) |
| Example 198 | | 29 | 2 | | | | | | 32(A) | 4(B) |
| Example 199 | | 30 | 2 | | | | | | 31(A) | 4(B) |
| Example 200 | | 31 | 2 | | | | | | 32(A) | 0(A) |
| Example 201 | | 32 | 2 | | | | | | 31(A) | 25(D) |
| Example 202 | | 33 | 2 | | | | | | 33(A) | 17(D) |
| Example 203 | | 34 | 2 | | | | | | 32(A) | 15(D) |
| Example 204 | | 35 | 2 | | | | | | 30(A) | 14(D) |
| Example 205 | | 36 | 2 | | | | | | 32(A) | 12(D) |
| Example 206 | | 37 | 2 | | | | | | 32(A) | 17(D) |
| Example 207 | | 38 | 2 | | | | | | 33(A) | 14(D) |
| Example 208 | | 39 | 2 | | | | | | 31(A) | 11(D) |
| Example 209 | | 40 | 2 | | | | | | 33(A) | 13(D) |

In the present Experimental Example, the organic resin coating film was formed on the hot-dip Al and Mg-containing Zn-plated steel sheet, and thereafter the plated steel sheet on which the organic resin coating film was formed was contacted with water vapor to blacken. In this case, it sometimes occurs that the corrosion resistance cannot sufficiently be improved even when the organic resin coating film is formed (see, Examples 176 to 184 and 201 to 209). On the other hand, the corrosion resistance of the black-plated steel sheets of Examples 160 to 175 and 185 to 200 on which a resin coating film of a urethane resin obtained by combining an ether-based polyol and an ester-based polyol in a predetermined ratio was formed has sufficiently been improved.

This application claims the benefit of Japanese Patent Application No. 2012-100449, filed on Apr. 25, 2012 and Japanese Patent Application No. 2013-062233, filed on Mar. 25, 2013, the disclosure of which including the specifications and drawings is incorporated herein by reference in its entirety.

INDUSTRIAL APPLICABILITY

The black-plated steel sheet of the present invention exhibits excellent design property, ability to maintain a black appearance, press formability, and corrosion resistance and therefore is useful as a plated steel sheet to be used for, for example, a roof material or exterior material of a building, an electric appliance, an automobile, or the like.

The invention claimed is:

1. A method for producing a black-plated steel sheet, comprising:
   reducing an oxygen concentration in a closed vessel to 13% or less by replacing air in the closed vessel with an inert gas or removing the air in the closed vessel;
   providing a hot-dip Al and Mg-containing Zn-plated steel sheet comprising a hot-dip Al and Mg-containing Zn-plated layer which comprises 1.0 mass % or more and 22.0 mass % or less of Al, and 1.5 mass % or more and 10.0 mass % or less of Mg; and
   contacting the hot-dip Al and Mg-containing Zn-plated steel sheet with water vapor in the closed vessel.

2. The method for producing a black-plated steel sheet according to claim 1, further comprising forming an inorganic coating film on a surface of the hot-dip Al and Mg-containing Zn-plated steel sheet.

3. The method for producing a black-plated steel sheet according to claim 2, wherein the inorganic coating film comprises one or more compounds selected from the group consisting of an oxide of valve metal, an oxoate of valve metal, a hydroxide of valve metal, a phosphate of valve metal, and a fluoride of valve metal, and
   the valve metal is one or more metals selected from the group consisting of Ti, Zr, Hf, V, Nb, Ta, W, Si and Al.

4. The method for producing a black-plated steel sheet according to claim 1, further comprising forming an organic resin coating film on a surface of the hot-dip Al and Mg-containing Zn-plated steel sheet.

5. The method for producing a black-plated steel sheet according to claim 4, wherein:
   an organic resin comprised in the organic resin coating film is urethane-based resin obtained by reaction of polyols consisting of an ether-based polyol and an ester-based polyol with polyisocyanate, and
   a proportion of the ether-based polyol in the polyols being 5 to 30 mass %.

6. The method for producing a black-plated steel sheet according to claim 5, wherein the organic resin coating film further comprises a polyvalent phenol.

7. The method for producing a black-plated steel sheet according to claim 4, wherein the organic resin coating film comprises a lubricant.

8. The method for producing a black-plated steel sheet according to claim 4, wherein the organic resin coating film comprises one or more compounds selected from the group consisting of an oxide of valve metal, an oxoate of valve metal, a hydroxide of valve metal, a phosphate of valve metal, and a fluoride of valve metal, and
   the valve metal is one or more metals selected from the group consisting of Ti, Zr, Hf, V, Nb, Ta, W, Si and Al.

9. The method for producing a black-plated steel sheet according to claim 4, wherein the organic resin coating film is a laminate layer or a coating layer.

10. The method for producing a black-plated steel sheet according to claim 4, wherein the organic resin coating film is a clear coating film.

11. A method for producing a formed article of a black-plated steel sheet, comprising:

reducing an oxygen concentration in a closed vessel to 13% or less by replacing air in the closed vessel with an inert gas or removing the air in the closed vessel;

providing a hot-dip Al and Mg-containing Zn-plated steel sheet comprising a hot-dip Al and Mg-containing Zn-plated layer which comprises 1.0 mass % or more and 22.0 mass % or less of Al, and 1.5 mass % or more and 10.0 mass % or less of Mg;

contacting the hot-dip Al and Mg-containing Zn-plated steel sheet with water vapor in the closed vessel; and forming the hot-dip Al and Mg-containing Zn-plated steel sheet into an article.

* * * * *